(12) United States Patent
Harper

(10) Patent No.: US 9,342,732 B2
(45) Date of Patent: May 17, 2016

(54) ARTIFICIAL INTELLIGENCE METHODS FOR DIFFICULT FORENSIC FINGERPRINT COLLECTION

(75) Inventor: Jack Harper, Evergreen, CO (US)

(73) Assignee: Jack Harper, Evergreen, CO (US)

( * ) Notice: Subject to any disclaimer, the term of this patent is extended or adjusted under 35 U.S.C. 154(b) by 412 days.

(21) Appl. No.: 13/455,369

(22) Filed: Apr. 25, 2012

(65) Prior Publication Data

US 2013/0287270 A1 Oct. 31, 2013

(51) Int. Cl.
| | | |
|---|---|---|
| G06K 9/40 | (2006.01) | |
| G06K 9/00 | (2006.01) | |
| G06K 9/03 | (2006.01) | |
| G06K 9/36 | (2006.01) | |
| G06K 9/62 | (2006.01) | |

(52) U.S. Cl.
CPC ........ *G06K 9/00073* (2013.01); *G06K 9/00006* (2013.01); *G06K 9/00013* (2013.01); *G06K 9/00067* (2013.01); *G06K 9/03* (2013.01); *G06K 9/036* (2013.01); *G06K 9/36* (2013.01); *G06K 9/6264* (2013.01)

(58) Field of Classification Search
USPC ......... 382/100, 115, 124, 125, 181, 190, 192, 382/195, 254, 270, 274–276
See application file for complete search history.

(56) References Cited

U.S. PATENT DOCUMENTS

| | | | | |
|---|---|---|---|---|
| 5,963,656 A * | 10/1999 | Bolle et al. | .................... | 382/124 |
| 6,018,586 A * | 1/2000 | Kamei | ............... | G06K 9/00067 382/125 |
| 6,256,022 B1 * | 7/2001 | Manaresi et al. | ............. | 345/174 |
| 6,658,164 B1 * | 12/2003 | Irving | ................ | G06K 9/00026 382/274 |
| 6,920,251 B2 * | 7/2005 | Toriyama | ............... | H04N 1/401 382/274 |
| 2002/0146156 A1 * | 10/2002 | Morimura et al. | ............ | 382/124 |
| 2002/0146178 A1 * | 10/2002 | Bolle et al. | ..................... | 382/254 |
| 2002/0191821 A1 * | 12/2002 | Bornes | .......................... | 382/124 |
| 2006/0056700 A1 * | 3/2006 | Abiko et al. | .................. | 382/190 |
| 2006/0110016 A1 * | 5/2006 | Smith | .......................... | 382/124 |
| 2009/0226052 A1 * | 9/2009 | Fedele | ............... | G06K 9/00046 382/125 |
| 2011/0090541 A1 * | 4/2011 | Harper | .......................... | 358/474 |
| 2011/0286639 A1 * | 11/2011 | Ramrattan et al. | ............ | 382/124 |

* cited by examiner

*Primary Examiner* — Eric Rush
(74) *Attorney, Agent, or Firm* — KIlpatrick Townsend & Stockton LLP

(57) ABSTRACT

Techniques are disclosed herein for artificial intelligence machine learning to increase collection of digital livescan fingerprints. According to certain embodiments of the invention, processing parameters can be automatically machine optimized for processing scan images of fingerprints (and other areas) to increase the amount of detected minutia. The processing parameters can alter and change over time to reflect historical successes and failures of particular optimizations. This allows a fingerprint collection device to learn over time and become more accurate (i.e., more successful at detecting minutia). Optimizations made by numerous fingerprint collection devices may be gathered and processed (e.g. by a central compiling server or cloud) to create the updated parameters, which can then be propagated to the numerous fingerprint collection devices. Additionally, the techniques further include receiving input from a user regarding physical traits of a scanned subject, to further customize the processing parameter optimization. Various other features are provided herein.

39 Claims, 17 Drawing Sheets

FIG. 12

WEDNESDAY, 11 JANUARY 2012 - 21:46 (GMT+0)

| Site 1 Settings | Site 2 Settings | Admin Settings | Password Mgr | Information |

Dept 1  Arkansas PD
ORI 1   AR1234567
Dept 2
ORI 2
Dept 3
ORI 3
Dept 4
ORI 4
Dept 5
ORI 5
Dept 6
ORI 6
Dept 7
ORI 7
Dept 8
ORI 8
Dept 9
ORI 9
Dept 10
ORI 10

☐ Medical Examiner
☐ Sequence Check
Timeout  0

-Read Only-

[ OK ]   [ User Password ]   [ Get Time ]

1200

2500

| WEDNESDAY, 11 JANUARY 2012 - 22:06 (GMT+0) | 🔋 |

Verification Page

Please confirm that the person described to the right is who you intend to submit data for before printing and/or transmitting.

ORI: AR1234567
Card: CRIMINAL-SUPPLEMENTAL

Subject Name: SMITH, JOHN
Subject Sex: M
Subject Height: 5' 11"
Subject Weight: 333
Subject SSN: 43233-4444

Back | Exit | Print | Transmit

ARTIFICIAL INTELLIGENCE METHODS FOR DIFFICULT FORENSIC FINGERPRINT COLLECTION

BACKGROUND

Fingerprinting has been and continues to be a common method used by governments and law enforcement agencies to identify individuals. Typically, forensic fingerprinting has involved taking a physical print of the ridges of an individual's skin surface using ink and paper cards. The paper cards can then be archived for comparison to other fingerprints (e.g., latent prints collected at a crime scene).

In recent years, the number of individuals being forensically fingerprinted has quickly grown. One reason for this trend has been a focus on global counter-terrorism and increased world-wide immigration, which has given rise to massive global people-tracking databases. Another reason has been government mandated moves by many industries to begin keeping forensic quality prints of their members. For example, forensic fingerprinting has begun to be required by groups within brokerage industries, legal services industries (e.g., lawyers), education industries (e.g., teachers), banking industries (e.g., bank employees), mortgage industries, and others.

In the context of this quickly growing demand for forensic fingerprinting, traditional ink and paper processes are becoming cumbersome and inefficient. As such, there has been a shift toward digital fingerprinting and archival. For example, paper cards are being scanned, or fingerprints are being collected by electronic scanners, and the data is being digitally stored for archival and processing. Stored data may then be used by systems, like automated fingerprint identification systems (AFIS), to assist with background checks, law enforcement, etc. Despite these advantages, fingerprint collection systems often cannot reliably and consistently acquire forensic quality fingerprint data. Current digital fingerprinting techniques encounter a difficult to collect print with about one in five people.

BRIEF SUMMARY

Among other inventions, techniques are disclosed herein for artificial intelligence machine learning to increase collection of digital livescan fingerprints. According to certain embodiments of the invention, processing parameters can be optimized that transform scan images of fingerprints (and other areas) to increase the amount of detected minutia. The processing parameters can alter and change over time to reflect historical successes and failures of particular optimizations. This allows a fingerprint collection device to learn over time and become more accurate (i.e., more successful at detecting minutia). Additionally, the techniques further include receiving real-time input from a system operator regarding physical traits of a scanned subject, to further customize the processing parameter optimization. Various other features are provided herein.

According to an embodiment, method for processing fingerprint data is provided. The method includes receiving an image of a fingerprint, processing the image with a first set of processing parameter values, and determining that a threshold amount of minutia has not been detected. The method further includes processing the image with a second set of processing parameter values, where the second set of processing parameter values is different than the first set of processing parameter values. The method also includes determining that the threshold amount of minutia has been detected, and updating the first set of processing parameter values based, at least in part, on one or more values of the second set of processing parameter values.

According to another embodiment, an apparatus for processing fingerprint data is provided. The apparatus includes a fingerprint scanning module configured to scan a fingerprint and provide an image of the fingerprint, a user interface configured to receive one or more input parameters, and a processing module coupled with the fingerprint scanning module. The processing module is configured to receive the image of the fingerprint from the fingerprint scanning module, process the image with a first set of processing parameter values, and determine that a threshold amount of minutia has not been detected. The processing module is further configured to process the image with a second set of processing parameter values, where the second set of processing parameter values is different than the first set of processing parameter values. The processing module is also configured to determine that the threshold amount of minutia has been detected, and update the first set of processing parameter values based, at least in part, on one or more values of the second set of processing parameter values.

According to yet another embodiment, a non-transitory, machine-readable media is provided with instructions embedded thereon for processing fingerprint data. The instructions, when executed by one or more machines, cause the one or more machines to receive an image of a fingerprint, process the image with a first set of processing parameter values, and determine that a threshold amount of minutia has not been detected. The instructions further cause the one or more machines to process the image with a second set of processing parameter values, where the second set of processing parameter values is different than the first set of processing parameter values. The instructions also cause the one or more machines to determine that the threshold amount of minutia has been detected, and update the first set of processing parameter values based, at least in part, on one or more values of the second set of processing parameter values.

Numerous benefits are achieved by way of the present invention over conventional techniques. For example, because the techniques allow a fingerprint collection device to learn from its successes and failures, it can become more accurate over time, reducing the amount of failures. Additionally, learned information can be shared among networked fingerprint collection devices to help increase the accuracy of all of the networked devices. These and other embodiments of the invention, along with many of its advantages and features, are described in more detail in conjunction with the text below and attached figures.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein:

FIGS. 9-25 are simplified illustrations of an example embodiment of a graphical user interface for fingerprint capture and management that can be utilized by any number of fingerprint collection devices; and FIG. 26 is a representation of a resistance map with rows and columns of values of measured resistance for respective rows and columns of cells of an asperity detector device, according to one embodiment.

Figure 1:
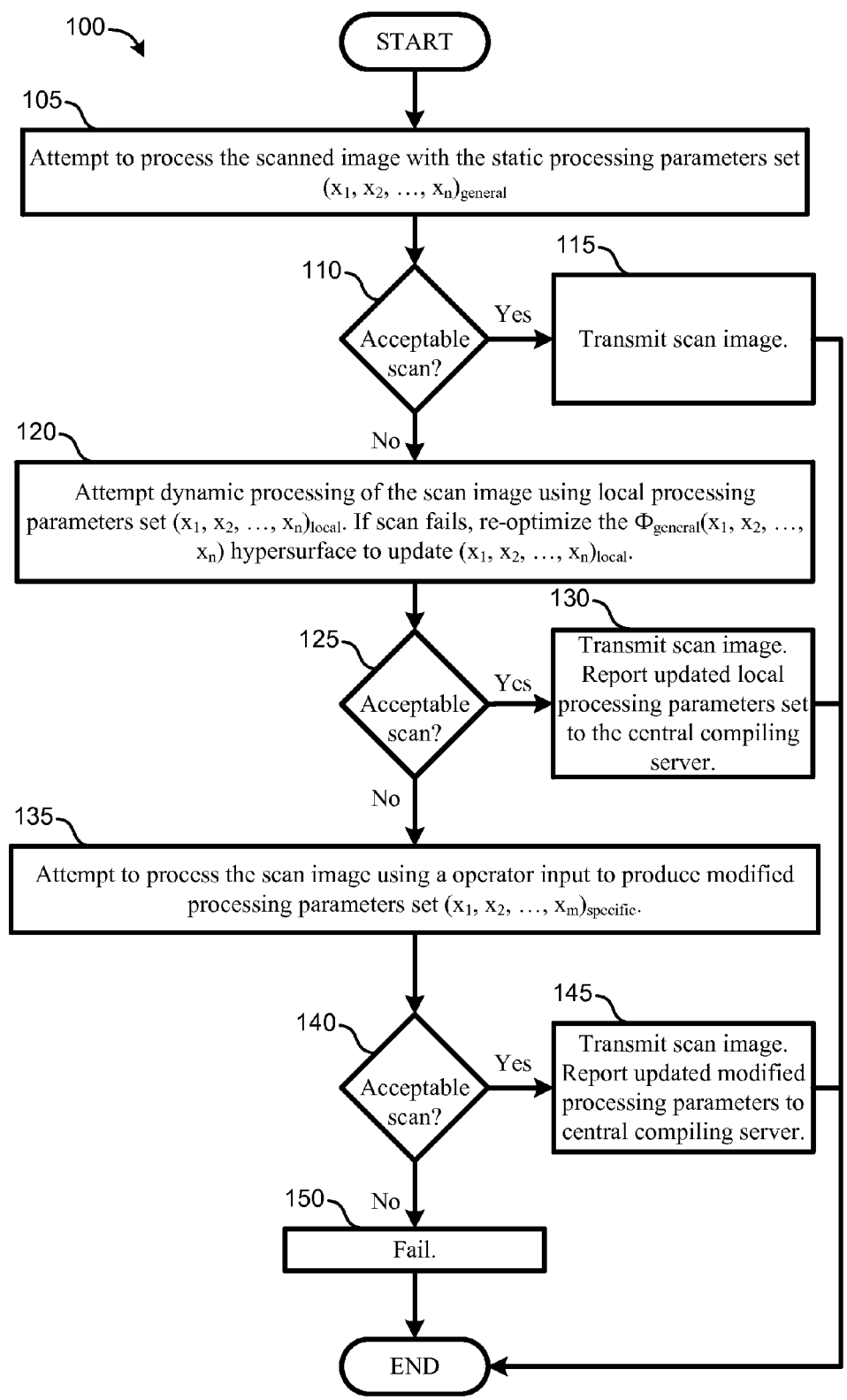
FIG. 1 is a simplified flow chart illustrating a process for implementing a fingerprint optimization algorithm, according to one embodiment.

In the appended figures, similar components and/or features may have the same reference label. Further, various components of the same type may be distinguished by following the reference label by a dash and a second label that distinguishes among the similar components. If only the first reference label is used in the specification, the description is applicable to any or all of the similar components having the same first reference label irrespective of the second reference label.

DETAILED DESCRIPTION

The ensuing description provides embodiments of various inventions and is not intended to limit the scope, applicability or configuration of the disclosure. Rather, the ensuing description of the embodiments will provide those skilled in the art with an enabling description for implementing an embodiment. It is understood that various changes may be made in the function and arrangement of elements without departing from the spirit and scope of this disclosure.

Artificial Intelligence Machine Learning Methods that Maximize Collection of Digital Livescan Fingerprints A human fingerprint is an impression of the friction ridges of any part of a finger. Fingerprint patterns of humans are unchangeable and immutable throughout the course of life from gestation through death and only naturally change with decomposition after end of life. No two humans, even duplicate twins, have ever been found that have identical fingerprints. Recent studies with genetically identical cloned monkeys show that they, like identical human twins, also have fingerprints that are different. The friction ridges of friction skin on the hands, fingers, and feet of all persons have, generally speaking, three identifying characteristics: ridge endings, bifurcations, and dots, the combinations of which are never repeated with any two people. A ridge ending is simply the point where a ridge ends. A bifurcation is where a ridge splits into a Y-shape to form two ridges and a dot is a very short ridge that looks like a "dot." Fine variations also occur such as trifurcations, islands, ponds, spurs, bridges, crossovers, and others. The combination and relative positions of ridge endings, bifurcations, and dots make up so-called minutia, which are the basic data sets that are used to match and identify fingerprints, a technical field known as dactyloscopy.

Fingerprinting has been the accepted verifiable method of personal identification for a century and a half. During that period, no two people have ever been found with friction skin in the same unit relationship that contains the same individual minutia characteristics. This means, in general, that any area of friction skin that can be covered with a U.S. dime coin on a person's fingers, palms, or soles of feet will contain sufficient individual characteristics in a unique unit relationship that will enable positive identification.

Livescan fingerprint collection is the process of directly recording fingerprint images in digital form with electronic equipment rather than with the classical ink and paper-based methods. The collected images are stored in large local, state, and national automated fingerprint identification systems (AFIS) for later lookup and matching.

Biometric fingerprint systems are different and are designed to identify persons who want to be identified (for example, to get physical access through a door). AFIS systems, in contrast, are designed to identify persons who are trying to hide their identity (for example, a murderer at a crime scene) and to stand up as forensic evidence in a court of law.

Fingerprint information that feeds AFIS systems is far more difficult and complex to collect than data that feeds biometric systems and is covered by numerous state and federal standards, certifications, and regulations. In general, biometric systems do not capture fingerprint information in a manner that is consistent with law enforcement fingerprint standards such as ANSI/NIST, FBI EFTS, and those of INTERPOL.

Collecting forensic fingerprint scans from human subjects can be a straightforward process with state-of-the-art fingerprint collection devices, such as digital livescan hardware/software systems. However, empirical experience shows that approximately one in five or so subjects being fingerprinted has at least one finger or palm that is, in practice, difficult to capture. The reasons for that difficulty include smaller than average fingerprint ridges (generally, females and certain ethnic/racial groups have smaller asperity features); worn ridges (for example, manual laborers such as brick masons or field hands—even office workers that handle paper over a long period of time); excessively oily skin; excessive dryness of skin; age (the very young with not yet fully formed ridges and the very old with age cracks across worn ridges); and aggravating climatic conditions such as low humidity and/or cold temperatures that cause poor scan contrast on the electronic livescan sensor or the inverse high humidity that causes smearing. Any one of these factors or any combination of the factors can yield a difficult to scan forensic fingerprint. An example of a scan subject that might be more difficult to fingerprint than the average could be an elderly South Asian female who has been a lifelong clerical worker with her fingerprints digitally collected during the winter in a very cold dry climate.

Current state of the art methods that try to deal with hard to scan prints include manually enhancing the ridges with application of various chemicals or enzymes (e.g., Sirchie EZcan Ridge Enhancer™). These compounds artificially, slightly, and momentarily raise the ridges or otherwise temporarily increase the scanned image contrast (e.g., Lanolin® compounds such as Corn Huskers® or the PreScan Fingerprint Enhancer by Identicator Inc.). Other techniques include having the printed subject breathe slowly and firmly on the difficult to scan digit as well as cleaning the hands with moisturizing soaps. The enhancement method used varies, depends on the exact situation, and is determined by the livescan system operator/technician based on experience and trial and error.

Occasionally it remains difficult after application of chemical compounds and use of other methods to scan sufficient information to yield good fingerprints. In addition, it is very easy to apply too much chemical applicant, which can cause even worse performance until the scan device has been manually cleaned. In the event that chemical or other application fails to yield fingerprint scans of sufficient quality, then the livescan system is usually instructed to simply ignore the offending finger or palm and to declare it as not scannable. Scan failure happens frequently enough that the formal FBI transmission specifications define such unscannable fingerprints as normal, but tagged, events.

According to an embodiment of the present invention, livescan scanning techniques can be extended to include image processing machine learning artificial intelligence-based algorithms to yield systems that learn and remember the best processing methods that efficiently enhance difficult to scan finger and palm prints in order to pass acceptance measures. Scanned fingerprint quality acceptance is automatically quantified by various means such as simple minutia counting and the like with straightforward suitable software processing.

The livescan scanning techniques described herein can be performed by a variety of hardware/software systems. Among other components, such systems can generally include a fingerprint scanning module for collecting an image of a fingerprint and/or other area of a subject's skin; a user interface (e.g., I/O module(s)) such as a touchscreen display for displaying and/or collecting information; a memory (e.g., storage module) for storing software, input parameters, and other data/information; a processing module (e.g., one or more processing units) for executing software code; and a network interface for communicating via a data network (e.g., the Internet). Such a system is described in U.S. patent application Ser. No. 12/580,072, entitled "Fingerprinting Scanning Systems and Methods" (hereafter the "'072 application"), which is hereby incorporated by reference in its entirety.

The usual method of collecting fingerprint information with current state of the art is a static protocol that consists of the following general sequence, in whole or in part: scan the finger with an electronic sensor (optical, capacitive, radio frequency, inductive, structured light, etc.) and then algorithmically process the image data with about seven steps: (1) Segmentation and filtering to extract quality data from background noise; (2) Contrast enhancement to grey stretch the data with a transform or transforms; (3) Orientation calculation usually with a gradient-based algorithm; (4) Frequency filtering frequently with a Gabor or similar filter to yield a robust image for minutia extraction; (5) Binarization to yield a one-bit grey scale image; (6) Feature thinning to yield single pixel-width image features; and finally (7) Feature extraction to yield standard minutia-based information such as ridge endings, bifurcations, dots, islands, bridges, crossovers, trifurcations, double bifurcations, etc. This state-of-the-art method is static with no real variation in methods or processing parameters, and the calculations simply proceed blindly. The static calculation parameters are usually predetermined empirically, once, with general subject data to yield a locally maximized parameter set that "usually" works typically about 80% of the time with random subjects.

With older methods, the finger is usually rocked back and forth and software analyzed in real-time until sufficient information has been extracted to yield a good print, if such can be obtained. The rocking, if effective, helps as image contrast may increase with moisture and natural skin oils being laid down on the scan device glass platen and then repeatedly picked back up and smeared onto the finger, which can increase the feature contrast to the point where the fingerprint can be recognized and collected.

According to an embodiment of the present invention, a dynamic approach is taken with no fixed methods or parameters and is based on image processing coupled with machine learning-based artificial intelligence. A learning machine is a device whose actions are influenced by past experience. The past experience, in this case, is the relative success or failure of different filters and image processing algorithms run against different types of fingerprints under different conditions with the parameter values that yield maximal minutia count remembered. Put broadly, where a first set of processing parameter values fail to yield a threshold amount of minutia, a second set of processing parameters can be determined and/or used. If the second set of processing parameter values yields at least the threshold amount of minutia, then the first set of processing parameter values can be updated to reflect the relative success of the second set of processing parameter values.

There are a number of processing parameters in the above defined seven step protocol that can be varied through a range. For example, the exact characteristics of a general complex Gabor filter are usually, but not always, defined by nine parameters: K, which scales the Gaussian envelope; $(\sigma, b)$, which scales the two axes of the Gaussian envelope; $\theta$, which is the rotation angle of the Gaussian envelope; $(x_0, y_0)$, which is the location of the peak of the Gaussian envelope; $(F_0, \omega_0)$, which specifies the spatial frequencies in polar coordinates; and which is the phase of the sinusoid carrier.

In addition, the characteristics of the segmentation, contrast enhancement, binarization, feature thinning, and feature extraction algorithms are also each similarly defined by associated process parameters that can also be varied through some range. Additional process parameters are the type of frequency filter that is employed along with their associated filter parameters.

Let n be the total number of such processing parameters. The variables $x_1, x_2, \ldots, x_n$, where each $x_k$ ($1 \leq k \leq n$) is one of the variables above, form the domain of an n-dimensional Euclidian hyperspace that contains the hypersurface defined by the function $\Phi_{general}(x_1, x_2, \ldots, x_n)$, which returns the number of found minutia as a function of the processing parameters $x_1, x_2, \ldots, x_n$ for a single scanned fingerprint image. The function $\Phi_{general}$ is determined empirically by machine calculation. Classic hill climbing optimization techniques yield the specific set of exact calculation parameters that maximize the minutia count for a particular scanned fingerprint image. By running individual fingerprints from a large set of test images through the above algorithm and then averaging the individual $x_1, x_2, \ldots, x_n$ values from the set of the maximals of each $\Phi_{general}$, the set $(x_1, x_2, \ldots, x_n)_{general}$ of processing parameter values will be found that work best across the entire set of test images.

This extensive learning calculation can be performed only once on a single machine to cover a set of any number of identical livescan systems. Experience shows that the $(x_1, x_2, \ldots, x_n)_{general}$ set of processing parameters works well to extract all minutia from about 80% of random scanned subjects.

An additional set of processing parameters that affect the learned response is on an individual machine basis and includes the age, ethnicity, sex, work history, labor type, etc. characteristics of subjects being fingerprinted most frequently; most usual climatic conditions for the particular machine; and others. Thus, a system used by a school district in Omaha, Nebr. to collect employee fingerprints might remember a very different optimal parameter processing set than a system used to collect, for example, fingerprints of farming villagers in very hot and humid southern India. An optimized processing parameter set for a system used by a police department in the usually very cold and very dry Aspen, Colo. area may be different still, especially during the winter. In addition, the optimized processing parameter set may automatically vary with the calendar date as read from the date/time clock hardware of the controlling process computer of the system. The processing parameter set for that particular system used in Aspen, Colo. might very well be different when used in the cold and very dry January local climate as compared to using the same system in the much warmer and, especially, more humid April climate.

A more advanced learning mode can be defined where each particular system adjusts and remembers its own $(x_1, x_2, \ldots, x_n)_{general}$ processing parameters set when it encounters difficult to scan subjects. If a particular fingerprint cannot be scanned, the system can ask the operator if it is permissible to attempt to re-optimize the $(x_1, x_2, \ldots, x_n)_{general}$ set by hill climbing the $\Phi_{general}(x_1, x_2, \ldots, x_n)$ hypersurface to a better maximum. If a new local or global optimum is found, then the $(x_1, x_2, \ldots, x_n)_{general}$ set can be adjusted to yield the new set $(x_1, x_2, \ldots, x_n)_{local}$. In this way, a particular machine can learn and adjust for local peculiarities in its most frequently seen scan population.

An even more advanced learning mode can be defined by extending the processing variable set $(x_1, x_2, \ldots, x_n)$ to include additional factors such as age, ethnicity, sex, work history, current climate, etc—all of which affect livescan quality. Call this new set of processing variables $(x_1, x_2, \ldots, x_m)_{specific}$, where m>n and m is the new total number of variables that include $(x_1, x_2, \ldots, x_n)$. The variables $x_1, x_2, \ldots, x_m$ form the domain of a new m-dimensional hyperspace that contains the hypersurface defined by the function $\Phi_{specific}(x_1, x_2, \ldots, x_m)$, which returns the number of found minutia, as a function of the processing variables $x_1, x_2, \ldots, x_m$, for a single scanned fingerprint image, where not only the $x_1, x_2, \ldots, x_n$ processing parameters have been specified, but also the age, ethnicity, sex, work history, current climate, etc have also been specified for the scanned fingerprint image obtained from a subject where all or some of those variables are known.

Again, classic hill climbing optimization techniques yield the specific set of exact calculation parameters $(x_1, x_2, \ldots, x_n)$ that maximize the found minutia count for a particular scanned fingerprint image with $x_{n+1}, x_{n+2}, \ldots, x_m$ held constant. For example, return the calculation parameters set $(x_1, x_2, \ldots, x_n)$ that maximizes the minutia count extraction for an elderly Asian female lifelong clerical worker scanned during the hot humid summer. By running individual fingerprints with known specified $x_{n+1}, x_{n+2}, \ldots, x_m$ parameters through the above algorithm and then averaging, over time as on-going data is collected from a large number of scan subjects on different machines and reported back to a central compiling server across the Internet, and averaging the individual $x_1, x_2, \ldots, x_n$ values from the on-going set of maximals of each $\Phi_{specific}$, a set $(x_1, x_2, \ldots, x_m)_{specific}$ of processing parameter values will evolve over time that work best across the entire set of seen scan subjects with known specified age, ethnicity, sex, work history, current climate, etc.

As the $(x_1, x_2, \ldots, x_m)_{specific}$ set evolves over time, it may be downloaded from the central compiling server to all individual livescan systems in the field via a data communication network (e.g., the Internet) to enable better and more precise fingerprint collection from diverse groups of scan subjects (accordingly, individual livescan systems can include a network interface.) Over time, the accuracy increases and the unprintable fingerprint count declines. The processing parameter variable set $(x_1, x_2, \ldots, x_m)_{specific}$ can be extended, over time, to include new variables as they arise. For example, perhaps ethnic Icelanders, one of the most genetically-pure populations on this planet, may be found to have certain fingerprint peculiarities that warrant a special mention of "Icelandicness" in the search space.

The above learning method optimizes the $(x_1, x_2, \ldots, x_m)_{specific}$ set for the most general scan subject characteristics, current climate conditions, etc., which enables the system operator to be able to manually guide the software, on initially unprintable subjects, by selecting from several graphical button inputs on the controlling color touchscreen such as "Male/Female", "Young/Middle-Aged/Elderly", "Manual Laborer/Not" (i.e., labor type), "Caucasian/Black/Asian", "Cold/Office/Hot", "Dry/Normal/Humid", and the like. Such operator guidance can push the static processing parameter set $\Phi_{general}(x_1, x_2, \ldots, x_n)$ away from the current mean in the search space to enable readable forensic quality fingerprints to be collected.

FIG. 1 is a simplified flow chart illustrating a process 100 for implementing the fingerprint optimization algorithm described above, according to one embodiment. This process can be implemented, for example, by a livescan hardware/software system. As with the other appended figures, FIG. 1 is provided as an example and is not limiting.

After a scanned image (e.g., of a fingerprint, palm, etc.) is obtained, the process 100 can begin at block 105, where processing the scanned image with the static processing parameters set $(x_1, x_2, \ldots, x_n)_{general}$ is attempted. According to some embodiments, block 105 can be executed if it is determined that processing parameters set $(x_1, x_2, \ldots, x_n)_{local}$ does not exist. Even so, static processing parameters set $(x_1, x_2, \ldots, x_n)_{general}$ has been shown to work well with roughly 80% of scan subjects.

At block 110, a determination is made whether the scan is acceptable. In some embodiments, for example, a livescan system may be able to determine whether an acceptable number (i.e., threshold amount) of minutia has been captured by analyzing one or more scanned images in real- or near-real-time as the subject rocks a finger, palm, etc. back and forth on a scanning platen. In other words, some or all of the blocks of the process 100 of FIG. 1 can be performed as the livescan system is scanning images of a subject. Additionally or alternatively, some or all of the process 100 may be performed after a scan image is obtained.

If the scan image is determined to be acceptable at block 110 by the processing performed at block 105, it is then transmitted and/or recorded, at block 115. The format, resolution, and other properties of the scan may need to conform to certain fingerprinting standards, depending on the receiving authority (e.g., ANSI/NIST, FBI EFTS, and those of INTERPOL, etc.).

If the scan image is not acceptable (e.g., does not produce an acceptable minimal number of minutia), then, at block 120, dynamic processing is attempted. The dynamic processing can include local processing parameters set $(x_1, x_2, \ldots, x_n)_{local}$. As indicated earlier, the local processing parameters set can include processing parameters optimized for the local demographic and/or date, which can be stored and/or updated on the livescan system, an attached storage device, or on a networked/remote storage device communicatively coupled with the livescan system.

The local processing parameters set $(x_1, x_2, \ldots, x_n)_{local}$ can be updated to reflect local optimizations conducted on a particular livescan system. A livescan hardware/software system therefore utilizes this machine learning to automatically optimize the local processing parameters. Additionally or alternatively, updates may reflect optimizations made by numerous individual and separate livescan systems, in which case optimization data is gathered and processed to create the updated parameters, which are then propagated to the livescan systems. The gathering and processing of data can be performed by a central compiling server to which the livescan systems are communicatively connected, and/or processed by one or more networked livescan systems (i.e., "cloud" computing).

At block 125, a determination is made whether the scan image is acceptable. According to some embodiments, if the dynamic processing of block 120 does not provide an acceptable scan, then the livescan device can be configured to ask the operator for permission to re-optimize the $\Phi_{general}(x_1, x_2, \ldots, x_n)$ hypersurface and to update the local processing parameters set $(x_1, x_2, \ldots, x_n)_{local}$ and, at block 130, report the update to the central compiling server if it results in an acceptable scan, and transmit and/or record the scan. As indicated above, the central compiling server (and/or a computing cloud) can process this data to update and propagate local processing parameters to one or more livescan systems. Of course, parameters do not need to be submitted at block 130 if they are not updated. Depending on the protocol used in a particular embodiment, the scan image can be transmitted and/or recorded unaltered or altered, and may be transmitted along with one or more of the local processing parameters.

If it is determined that the processing at block 120 failed to produce an acceptable scan image, then specific processing can be attempted at block 135. The specific processing can include modified processing parameters set $(x_1, x_2, \ldots, x_n)_{specific}$, which can include parameters to reflect observations about the particular subject being scanned. For example, the livescan system can be configured to ask the operator to help the process by touching characteristics buttons such as "Male/Female", "Young/Middle Aged/Elderly", etc., to provide input parameters to further categorize the scanned subject.

At block 140, a determination is made whether the scan image is acceptable. If processing the scan image with the modified processing parameters set $(x_1, x_2, \ldots, x_n)_{specific}$ fails to yield an acceptable result, then according to some embodiments, the livescan system can be configured to ask the system operator for permission to optimize the $\Phi_{specific}(x_1, x_2, \ldots, x_n)$ hypersurface. In this case, the modified processing parameter set $(x_1, x_2, \ldots, x_n)_{specific}$ can be updated and reported to the central compiling server if a good scan is then obtained, at block 145. If no updates are made, then the modified processing parameter set does not need to be transmitted and/or stored. Regardless of whether an update was made, the scan image is transmitted if the scan image is determined to be acceptable. Again, depending on the protocol used in a particular embodiment, the scan image can be transmitted unaltered or altered, and may be transmitted along with one or more of the modified processing parameters. Otherwise, at block 150, processing of the scan image is determined to have failed to produce an acceptable scan image.

It should be appreciated that the specific steps illustrated in FIG. 1 provide a particular method of processing a scan image according to an embodiment of the present invention. Other sequences of steps may also be performed according to alternative embodiments. For example, alternative embodiments of the present invention may perform the steps outlined above in a different order or in parallel. Moreover, the individual steps illustrated in FIG. 1 may include multiple sub-steps that may be performed in various sequences as appropriate to the individual step. Furthermore, additional steps may be added or removed depending on the particular applications. One of ordinary skill in the art would recognize many variations, modifications, and alternatives.

Novel Soft Keyboard Implementation

Many real-time embedded computer systems, including embodiments of the livescan system described above, employ touch screen-based soft keyboards that are implemented as collections of graphical items that are designed to be triggered by human touch.

Figure 2:
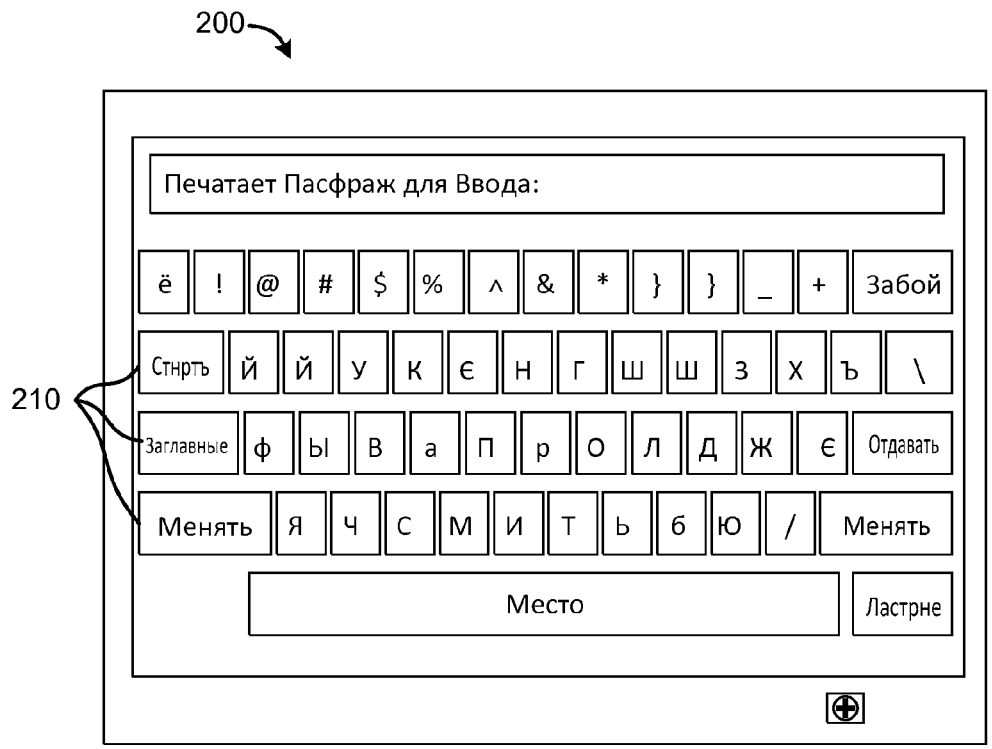
FIG. 2 is a simplified illustration of a user interface displaying a soft keyboard, according to one embodiment.

The common method to implement such soft keyboards is to organize the QWERTY (or other, for example the German character set that includes items with umlauts such as "Ä" and "Ü" as well as special characters such as "β"; the Russian Cyrillic character set that includes characters such as "Я ", "Щ ", "Ю ", and the like; and the Arabic character set that is closely unique to itself) touch keys as organized collections of graphical items that frequently are high-level active software constructs (e.g., objects), usually called 'buttons', that are triggerable by human touch. FIG. 2 is a simplified illustration of a user interface 200 displaying such a soft keyboard. When individually triggered by a touch, the graphical keys 210 activate software object methods that simulate or replicate the same software actions that are triggered by physically pressing equivalent hard keys on physical keyboards. The result of a valid touch is a returned typed character—for example, touching the "Ä" key graphic results on a German soft keyboard with the binary equivalent of the "Ä" character returned to the software application.

However, the software overhead incurred by executing the associated object method (e.g., "before," "after," "mixin," and other methods) usually results in slow and cumbersome soft keyboard key response—frequently several hundred milliseconds, which can be too slow to allow human touch-typing speeds. Recent dramatic declines in the cost of physical computer memory make it economically and physically feasible to trade-off higher memory requirements against lower processor overhead to dramatically increase soft keyboard response to physical touch. Embodiments of a novel soft keyboard implementation described herein make such a tradeoff.

Physical touch screen devices usually yield two-dimensional (x y) coordinates as response to a physical touch that uniquely identifies selected pixel elements. If the minimum to maximum pixel address for the horizontal x and vertical y coordinates for a particular touch screen range from 0, 1, 2, . . . n−1 and 0, 1, 2, . . . , m−1 respectively, then the touch screen has a total of n*m addressable pixel elements, where the "*" represents simple integer multiplication.

Figure 3:
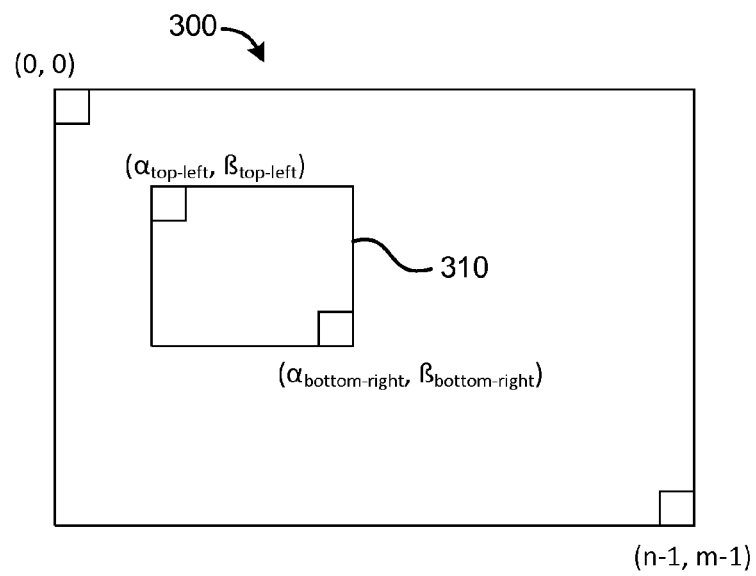
FIG. 3 is a simplified illustration of a representation of a touch screen display having a soft keyboard, according to one embodiment.

FIG. 3. is a simplified illustration of a representation of a touch screen display 300 having a soft keyboard. A representation of the soft keyboard 310, which visually floats on the touchscreen, can be defined to extend diagonally from the top-left point $(\alpha_{top-left}, \beta_{top-left})$ to $(\alpha_{bottom-right}, \beta_{bottom-right})$, where $0 \le \alpha_{top-left} \le n-1$; $0 \le \beta_{top-left} \le m-1$; $0 \le \alpha_{bottom-right} \le n-1$; $0 \le \beta_{bottom-right} \le m-1$; $\alpha_{top-left} < \alpha_{bottom-right}$; and $\beta_{top-left} < \beta_{bottom-right}$. A three-dimensional array of size $(\alpha_{bottom-right} - \alpha_{top-left}+1)*(\beta_{bottom-right} - \beta_{top-left}+1)*$NumberOfAttributes, can be constructed in computer memory, where $0 <$ Attribute $\le$ NumberOfAttributes, where NumberOfAttributes is the number of character attributes such as "lower case," "upper case," "meta," "hyper," "control," etc., and where Attribute selects the current character attribute. In certain embodiments, each element of the three-dimensional array can be the character, in some suitable digital encoding, that is returned when the associated touch screen pixel element is physically pressed or zero, or equivalent, if the pressed pixel element has no associated character.

Thus, if touch screen pixel element (x, y), where $\alpha_{top-left} \le x \le \alpha_{bottom-right}$ and $\beta_{top-left} \le y \le \beta_{bottom-right}$, is physically touched and Attribute ("lowercase," "uppercase," "meta," "hyper," "control," etc.) has value 0<Attribute≤NumberOfAttributes, then the associated character is very quickly found by simply locating the (x−$\alpha_{top-left}$, y−$\beta_{top-left}$, Attribute)$^{th}$ element of the three-dimensional array. In an embodiment implemented in Common Lisp, for example, the s-expression (aref 3-d-array (−x $\alpha_{top-left}$)(−y $\beta_{top-left}$) attribute) would return the associated character, if any, for a touched touch screen pixel element.

The set of graphical keys displayed visually on the touch screen typically consists of rounded rectangular areas that, in common implementations, are painted to the screen with each area filled with a painted image of the associated character in human readable form. In contrast, according to embodiments of the present invention, an entire pixel image for each attribute (e.g., "uppercase," "lowercase", "meta," "hyper," "control," etc.) can be precomputed and stored before use. When the attribute changes, for example by the user touching the "shift" key, then the correct precomputed pixel image for the entire keyboard image, in its entirety, is retrieved and quickly painted to the touch screen.

The three-dimensional array also can be precomputed, prior to use, with the individual characters to be returned by each pressed pixel element. Array elements that represent null areas outside painted letter areas on the touch screen are prefilled with zeroes (or equivalent, for example in an embodiment implemented in Common Lisp, with nils) to represent invalid touches that can be ignored.

This method of implementing a touch screen soft keyboard can result in a typing system that functions within a bounded O(1) runtime that, in practice, is orders of magnitude faster than usual methods to yield the capability of human touch-type speeds.

Fast and Secure Method for Storing and Retrieving Fingerprint-Specific Information to/from Medium-Scale Databases Certain fingerprint collection devices, such as Automatic Fingerprint Identification Systems (AFIS), can store and track a number of data items that can be divided into classes. The first class includes identifying textual information such as name, aliases, addresses, social security, driver's license and/or other government identifying numbers, scars/marks/tattoo identification codes, criminal charges, etc. The second class includes larger items that are required that include calculated minutia that represent, in a highly glossy but compact and easily fuzzy searchable manner, fingerprints in a highly compressed vector or array form for fast tentative identification/lookup. A third class includes even larger items such as actual fingerprint and/or palm print pixel images, usually stored in a lossless wavelet or other standard compressed form, and mug shots, etc. Each set of fingerprint images consists of two four-finger flat slap scans; two thumb flat slap scans (left and right); ten individual full-rolled forensic quality single digit scans; along with possibly left and right full palm prints; color or monochrome mug shots; already generated fingerprint card images (e.g., FBI FD-258 and/or state or foreign (e.g., INTERPOL cards)); and/or other identifying and/or history textual information.

With portable AFIS systems in particular, it is important that the information be strongly enciphered to protect the data from compromise or misuse in the event of physical system loss or theft and from Internet-borne attack. However, small compact mobile systems have inherent processor limitations that result from conflicting requirements for high-response speed, limited generated heat, small physical size, maximized battery life, among others. An additional design factor for small portable mobile AFIS systems is the requirement to efficiently handle medium scale fingerprint sets of, for example, 2,000 to 20,000 print sets. This number will float upward over time, however, in accordance with Moore's well known classic law. All of the included data items are searchable, though the first two item classes above (text and minutia sets) are searched far more frequently than the actual images, the third class above, which usually are simply displayed or printed after a fingerprint set of interest has been tentatively identified by a text or minutia fuzzy search.

The fingerprint information may be too large to protect using straightforward standard encipherment techniques on computationally limited low-power mobile systems. Thus, embodiments of a crypto system design as described herein (which can be utilized in a fingerprint collection device), have been devised that are specific to such small mobile fingerprint collection devices with all of the information strongly enciphered to the NIST FIPS 140-2 (or foreign equivalent) or higher level when resident in persistent memory.

The fingerprint information can be structured in a manner such that the most frequently searched and smallest data items are stored in high-speed memory (dynamic random access memory (DRAM)) such that they are linked for efficient lookup to the large fingerprint and other imagery and minutia vectors/arrays that are securely stored in slow mass storage, typically solid state flash or physically rotating mechanical magnetic storage. Various encipherment techniques used to protect the smaller text data can be utilized, including those as described in the '072 application.

Figure 4:
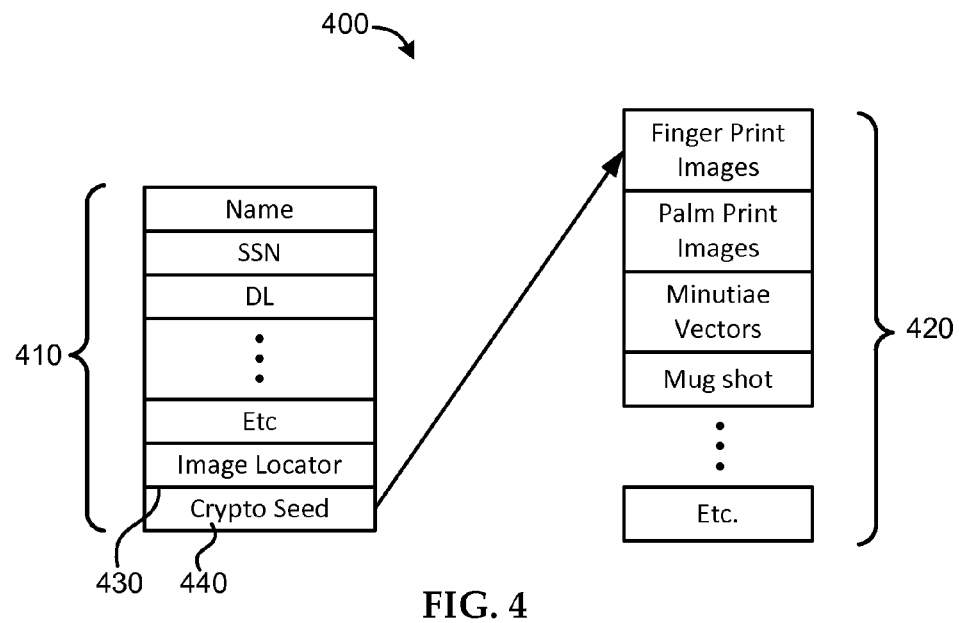
FIG. 4 is a representation of an embodiment of a fingerprint data set record.

FIG. 4 illustrates an example embodiment of a fingerprint data set record. A complete fingerprint set data record in this defined protocol can consist of two parts: (a) text and other small information 410 that reside in high-speed (DRAM) memory during runtime; and (b) fingerprint images, palm print images, and minutia information 420 that reside in persistent slow mass storage. The "Image Locator" field 430 in the text record can uniquely identify the associated large flash/solid state memory record using an identifier, which can be as simple as a physical record number or address, a file name, etc. or can be more complex such as a key or offset into a database structure. The "Crypto Seed" field 440 can be a pseudo-random constant unique number, typically 32 or 64 bits in length with current technology, calculated by a cryptographically secure random number generator, such as Blum-Blum-Shub, Fortuna, or equivalent (or by a cryptographically secure hardware source of such random numbers). The large image flash/solid state memory records may be always enciphered except when being individually examined in high-speed (DRAM) memory.

All of the imagery data can be enciphered by seeding a cryptographically secure random generator, such as Blum-Blum-Shub, with the stored "Crypto Seed" value and then Boolean XORing each 32- or 64-bit fragment of the imagery record with subsequent generated 32- or 64-bit values from the generated pseudo-random number stream that results from the Crypto Seed as a base. Thus, to in place destructively encipher an imagery record, the following steps can be taken:

(a) Set a variable n to the number of 32 (or 64 bit) fragments that make up the imagery data record.

(b) Seed a cryptographically secure random number generator, such as Blum-Blum-Shub or equivalent, with the Crypto Seed that is obtained from the associated enciphered text record.

(c) Set imagery[k]:=imagery[k]$\oplus r_k$, for k:=0, n−1 where imagery[k] is the kth fragment of the imagery data record and where $r_k$ is the kth random number in the random number stream generated by the cryptographically secure random number generator and where $\oplus$ is, of course, the 32 or 64-bit standard Boolean logical exclusive or (XOR) operation.

To destructively decipher an imagery record in place, the same algorithm above (which is, of course, symmetric) can be run.

During the system start up sequence, all small text records (which can include, for example, 2,000 to 20,000 records) are read from persistent memory (flash/solid state or mechanical rotating magnetic memory). The records are deciphered using the pass-phrase based crypto protocol, such as that defined in the '072 application. The records are then stored in high-speed (DRAM) memory for fast access and modification. At system shut down, or when text information has been modified or added, all of the text records are enciphered and written to persistent memory using the pass-phrase based crypto protocol, such as that detailed in the '072 application. In an embodiment implemented in Common Lisp, the reading, writing, encipherment/decipherment of the text information could be carried out by constructing stream methods on top of the standard polymorphic I/O stream methods, which fully implement the described crypto protocol. Similar methods could be used in other embodiment implementation environments such as C#, C++, C, Ruby, Erlang, Java, assembly, and machine language, etc.

The storage method to manage the small text records can handle multiple entries that have identical names, addresses, aliases, ages, scars marks tattoos, social security and drivers license numbers, etc. Thus, any number of separate individuals may have exactly the same identifying textual information, but different fingerprints, palm scans, mug shots, etc. Many unique social security numbers, for example, are used fraudulently by hundreds and even thousands of people illegally.

Figure 5:
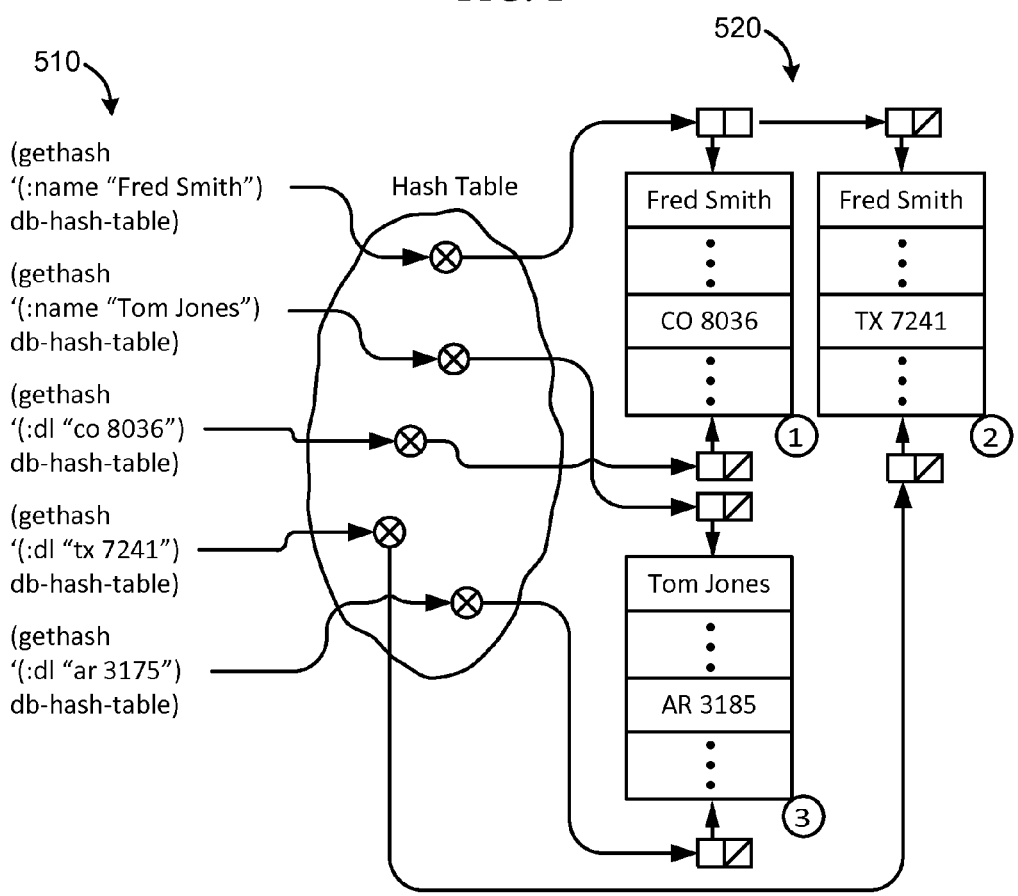
FIG. 5 is a simplified illustration showing an embodiment of a hashing process, according to an embodiment.

Text data in this defined protocol for each record is stored in high-speed (DRAM) memory in a uniquely-addressed structure, such as, for example, the text and other small information 410 illustrated in FIG. 4. Each searchable key field, such as name, social security number, scars/marks/tattoo codes, etc. can be hashed to yield a linked list of text records that have the identical text values for the key. FIG. 5 is a simplified illustration showing an embodiment of such a hashing process.

To lookup a keyed field in the database, hash the name of the field coupled with the text value of the field 510. For example, in an embodiment implemented in Common Lisp (gethash '(:name "FRED SMITH") db-hash-table) would yield the list of records 520 that contain the desired :name text field, "FRED SMITH". Such a list would be nil if no such data records exist in the database. In this example, (gethash '(:name "FRED SMITH") db-hash-table) would return the list (<1><2>), whereas (gethash '(:name "FRANK JONES") db-hash-table) would return the nil list.

To add a new fingerprint record to the database, the new structure record can be created with the text items, image locator, and crypto seed filled in. For each keyed field, hash the field coupled with the key (e.g., in an embodiment implemented in Common Lisp, (gethash '(:name "FRED JONES") db-hash-table) would retrieve the list of current entries with the same field). The new record can then be appended to the front of the list with the hash value set to the updated value. For example, in simplified pseudo-Common Lisp with no error handling and with no consideration to efficiency, the following code can be used:

```
(let ((new-record (create-new-fingerprint :name "FRED JONES" <etc>)))
    (setf  (gethash '(:name "FRED JONES") db-hash-table)
          (cons new-record (gethash '(:name "FRED JONES")
          db-hash-table))))
```

To remove an existing fingerprint record from the database, the field coupled with the field name can be hashed and be used to destructively remove the item from the list for each keyed field.

The database can also easily be used to manage non-fingerprint specific, but related information. For example, it is frequently important for a fingerprint management system to know the state/province and country in which it is operating to enable the system to understand, for example, required or allowed fingerprint card formats, allowable transmission methods to support, etc. The database in this defined protocol easily supports such capabilities. For example, in an embodiment implemented in Common Lisp, (gethash :state db-hash-table) might yield :hesse and (gethash :country db-hash-table) might yield :deutschland for a system configured to operate in Frankfurt, Germany.

To write the entire database to persistent mass storage, in for example a Common Lisp embodiment, simply delete the old file and then (print db-hash-table output-stream) to an open output stream object augmented with the polymorphic crypto protocol methods, such as that provided in the '072 application. Two copies of the hash table database can be kept, with appropriate software checking mechanisms, to guard against corrupt data generated by the inevitable inadvertent power failures etc. encountered in practice with portable real-time mobile devices.

Livescan Fingerprint Enhancement

Empirical experience indicates that approximately 20% or so of subjects being livescan fingerprinted exhibit worn ridges, cracked skin, low contrast, and/or other physical faults that make collecting their fingerprints difficult or even impossible without artificial enhancement. Such enhancements currently used in the field include simple moistening with the subject's natural breath with long slow exhalation applied to the scan problematic digits; application of organic enzymic compounds that momentarily raise fingerprint ridges to enable better collection; application of artificial moisturizing agents such as the commercial product Corn Huskers® that contains lanolin; and others. The inventor has discovered a simpler inexpensive alternative.

According to embodiments for enhancing livescan fingerprint capture, cotton wool can be impregnated with a solution comprising approximately 91% isopropyl alcohol and placed in a bottle such that vapor from the impregnated cotton wool exits at the mouth of the bottle. One or more of a subject's fingers can be placed in the vapor at the top of a bottle for a few seconds, then scanned, significantly increasing the likelihood of an acceptable scan image. Alternatively, cotton can be placed at the bottom of a bottle containing a small amount of solution comprising approximately 91% isopropyl alcohol, such that a bottom portion of the cotton absorbs the solution, but a top portion of the cotton remains dry. The subject then can simply press one or more fingers (or other skin to be scanned) into the dry top portion of the cotton for a few seconds without coming in contact with the isopropyl alcohol. Empirical experience indicates that the isopropyl alcohol, probably acting as an astringent that slightly stretches or contracts the skin, causes the fingerprint ridges to slightly quickly raise, thus enhancing the ability to collect livescanned prints.

These fingerprint-enhancing techniques can have various advantages over other methods of fingerprint enhancement. Such advantages include no residual oiliness as left, for example, by lanolin containing moisturizer compounds; no requirement to have to apply organic compounds onto the fingers; and alcohol applied by the described method quickly dissipates and leaves no residue.

Various alterations can be made to the embodiments described above. In some embodiments, containers other than bottles can be utilized. In other embodiments, no container may be used. The solution can comprise other concentrations of isopropyl alcohol, although it may impact the effectiveness of the fingerprint-enhancing technique. According to some embodiments, for example, the solution may contain approximately 60%, 70%, 80% isopropyl alcohol, or any amount between 60%-91%. Other embodiments may include solutions of less than 60% isopropyl alcohol, or more than 91% isopropyl alcohol, if such solutions are available. The duration of time during which the subject's skin is exposed to the vapor of the solution can vary as well, which can be impacted by the type of solution used, the concentration of the vapor, and other factors. According to some embodiments, for example, the subject's skin may be exposed for 2-4, 4-6, or 6-8 seconds. Other embodiments can include exposing the subject's skin for less than 2 seconds or more than 8 seconds. A person of ordinary skill in the art will recognize many additions, variations, and substitutions.

Latent Fingerprint Collection Protocol

Experience shows that on the order of half of latent fingerprints collected at crime scenes are destroyed during the lifting process and are lost as forensic evidence. The standard method, in general terms, to collect a latent fingerprint (or palmprint) at a crime scene is to dust the print with a fine talcum-like powder that typically consists of a finely ground metallic oxide as a coloring agent coupled with a binding and fixing agent. The powder binds to the latent print, which is made of the natural fluids and oils secreted by the skin, and the now visible latent fingerprint is transferred to a sticky clear mylar-like tape or to a white paper card. The latent fingerprint is permanently bound by sandwiching the clear mylar or by covering the collected print image with a clear sticky plastic film to protect the forensic evidence. However in practice, as stated above, on the order of half of latent fingerprints are destroyed and rendered useless during the collection process. They are visible before collection, but are destroyed during the dusting and lifting process.

Figure 6:
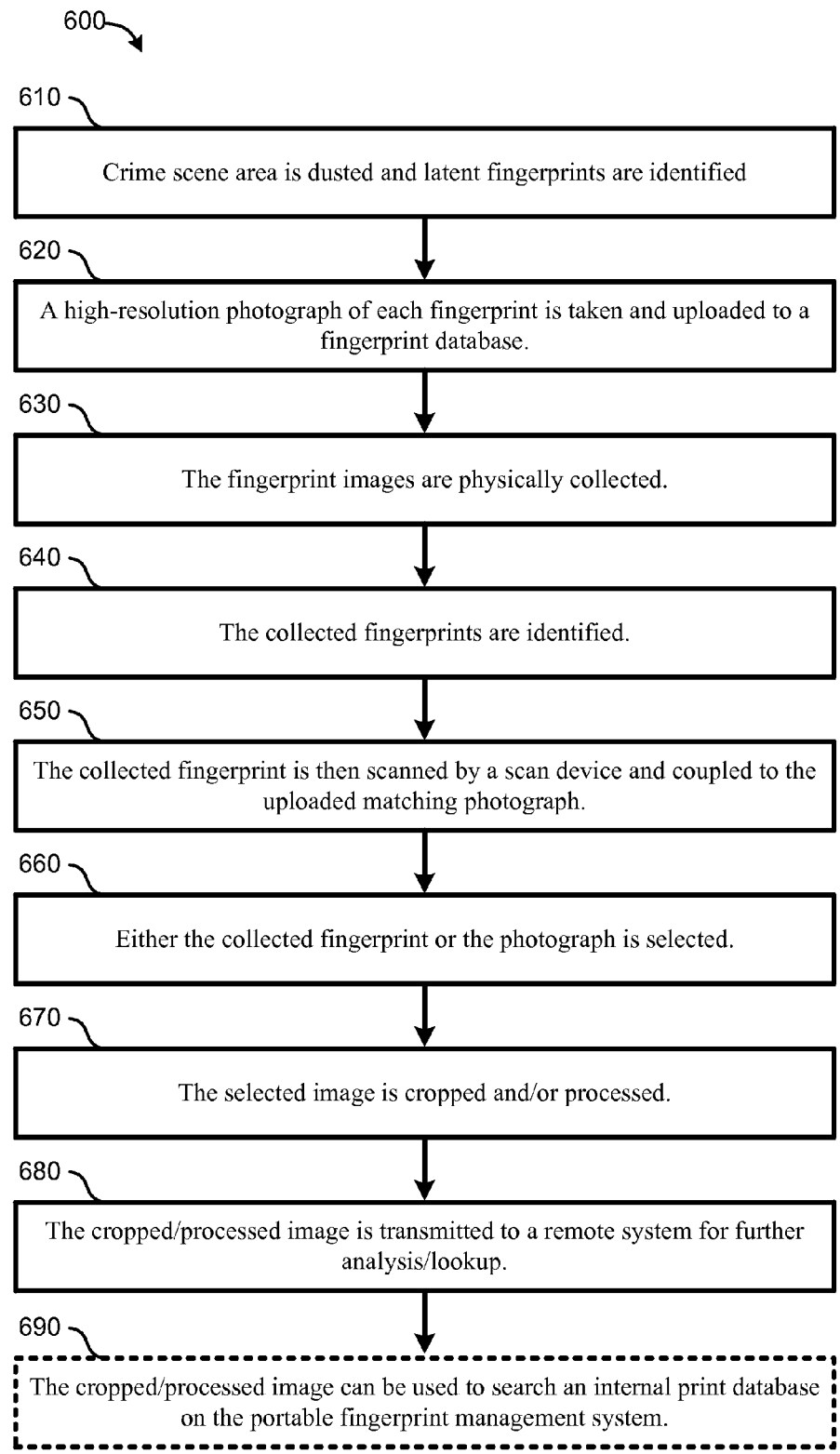
FIG. 6 is a simplified process flow diagram illustrating an embodiment of a process for implementing such a latent fingerprint collection protocol.

According to embodiments of an invention for latent fingerprint collection protocol provided herein below, certain software and hardware can be used to overcome this 50% destruction rate. FIG. 6 is a simplified block diagram illustrating an embodiment of a process 600 for implementing such a latent fingerprint collection protocol.

The process can begin at block 610, in which a crime scene area is dusted, and latent fingerprints are visibly identified. At block 620, a high-resolution photograph of each latent fingerprint of interest is taken and uploaded automatically into a fingerprint database. The record in the print database can be identified by, for example, touchtyping on the touchscreen to identify information as required by local, state, and federal chain of evidence regulations and procedures.

At block 630, the dusted latent fingerprint images are physically collected. This can include methods such as collecting the image onto the clear mylar-like plastic and then sandwiched together or onto the white card and then covered by clear tape. At block 640, the collected latent fingerprints are then identified by the fingerprint collector or by the case detective usually by manually writing on the forensic evidence with a permanent marker or pen. At block 650, the collected fingerprint with identifying handwritten text is then scanned by a small external scan device connected to the portable fingerprint management system at the crime scene. The external scan device can be communicatively connected with the portable fingerprint management system by a USB or other interface cable, or a wireless connection, and the scanned image can then be placed automatically into the fingerprint database coupled to, or associated with, the uploaded matching photograph.

At block 660, either the collected fingerprint or the photograph is selected. If the fingerprint survived the collection process, then that image is selected. However, if the latent fingerprint did not survive, then the previously uploaded photograph of the dusted print is selected. At block 670, the collection technician or case detective can bring the selected image up on, for example, the color touchscreen of the portable fingerprint management system where the image may be cropped and/or image processed to bring out faint detail by using standard computer algorithms that operate identically on each pixel of the image. At block 680, the cropped/processed image can then be transmitted direct from the portable fingerprint management system to a remote system for further analysis and/or lookup. The transmission can be sent through a standard in-patrol car Internet connection to a remote system such as the home crime lab for further analysis and/or to the state/federal authorities for lookup. The collected latent fingerprint can also be manually transported back to the home crime laboratory inside the portable fingerprint management system if remote connectivity through the patrol car is not available.

Finally, at block 690, the cropped/processed image optionally can be used to search an internal print database on the portable fingerprint management system of, for example, known local criminals. For example, a detective that specializes in burglaries might have printsets of known burglars stored locally in a portable fingerprint management system for such immediate fast search, which would enable latent fingerprints collected at a crime scene to be looked up and identified at the crime scene immediately. Such functionality can speed up the identification process substantially and significantly increase the probability of apprehending the offender.

It should be appreciated that the specific steps illustrated in FIG. 6 provide a particular latent fingerprint collection method according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

The utilization of such a protocol can have numerous advantages. For example, time savings, where crime scene latent fingerprints are transmitted for immediate lookups as compared to the usual 1-2 day delay. The protocol can also provide the ability to enhance and process collected latent fingerprints on-site at crime scenes while conditions are fresh in the mind. The protocol further can allow the ability to identify criminal perpetrators immediately on the crime scene from current database matches. Additionally, the protocol provided herein enables the ability to realize a dramatic reduction in loss of collected latent fingerprints.

Hardware Cryptographic Device Method to Protect Software Object Codes

A perpetual problem for commercial software developers is theft and illicit use or resale of delivered software object files from systems installed in the wild. Thieves are able to lift runtime object codes from host processor systems simply by copying and then rebranding and/or reusing the software at will. For example, various sources estimate that up to 90% of instances of Microsoft Windows® operating systems that are installed in certain countries have been stolen and are being used illegally.

Various means have traditionally been used to try to prevent such theft. One of the more common methods has been to employ small hardware cryptographic modules of varying sophistication to protect software. The cryptographic hardware can vary in sophistication, capability, and expense from fairly simple and not cryptographically secure, but costing only a few dollars, to the far more sophisticated, but costing several or many thousands of dollars. An example of a fairly simple and inexpensive cryptographic device would be the SG-Lock™ device produced in Germany, which implements in hardware the Tiny Encryption Algorithm (TEA) cryptographic algorithm with a fairly well protected unique embedded key, all in an inexpensive (on the order of $10 USD) and compact USB "keyfob" or "thumbdrive"-sized device.

The advantages of the SG-Lock cryptographic module include an inexpensive price and the ability to provide hardware-based protection against casual interlopers with at least some fairly sophisticated cryptanalytic techniques required to break into protected software if correct usage is employed. A disadvantage of the SG-Lock device is the fact that it only implements the TEA algorithm, which is known to not be cryptographically secure against sophisticated cryptanalytic attack. An additional negative is the very limited processor speed of this very inexpensive device, which precludes enciphering/deciphering large blocks of information, which would require inordinate amounts of time. Realistically, the best way to use such a limited device would be to manage cryptographic keys to the level of actual security provided by the device.

An example of a more capable but more costly cryptographic device would be the Crypto2000™ device from the United States that implements the full AES-256 cryptographic algorithm with very well hardware protected embedded keys in a more expensive (on the order of $1000 USD) device that has been certified by National Institute of Standards and Technology (NIST) to the FIPS 140-1 standard, which provides a relatively high level of cryptographic security. A primary advantage of a device such as the Crypto2000 is strong NIST certified cryptographic protection in a small package. A primary disadvantage is the 100× cost over the low cost SG-Lock device.

Embodiments of a hardware cryptographic device provided herein below can provide software protection up to the theoretical limit allowed by the hardware cryptographic device at an affordable cost point. Some embodiments, for example, currently can be implemented at approximately $10 USD.

A simple scheme utilizes a limited device, such as the SG-Lock™, by having it encipher, during the application start sequence, a known 32-bit constant with the device's embedded unique TEA key and then compare the enciphered result with the previously calculated value. To defeat this simple scheme most easily would involve simply reverse engineering/disassembling the protected object code and replacing the instructions that do the check with NOP ("no operation") instructions to bypass the check in surreptitiously modified binary code. A more secure protection method would be to encipher, at protected application software build time, a portion of the run-time instructions of the protected binary object code or to encipher certain critical data required for the application to correctly operate and then to decipher the items, on-the-fly, during the application start sequence. However, such an approach would be slow due to the very limited cryptographic processor speed of the SG-Lock™; the method would not easily survive software updates that moved items within the object code; and it would not easily work with computer architectures that write-protect the machine instructions of an application.

Figure 7A:
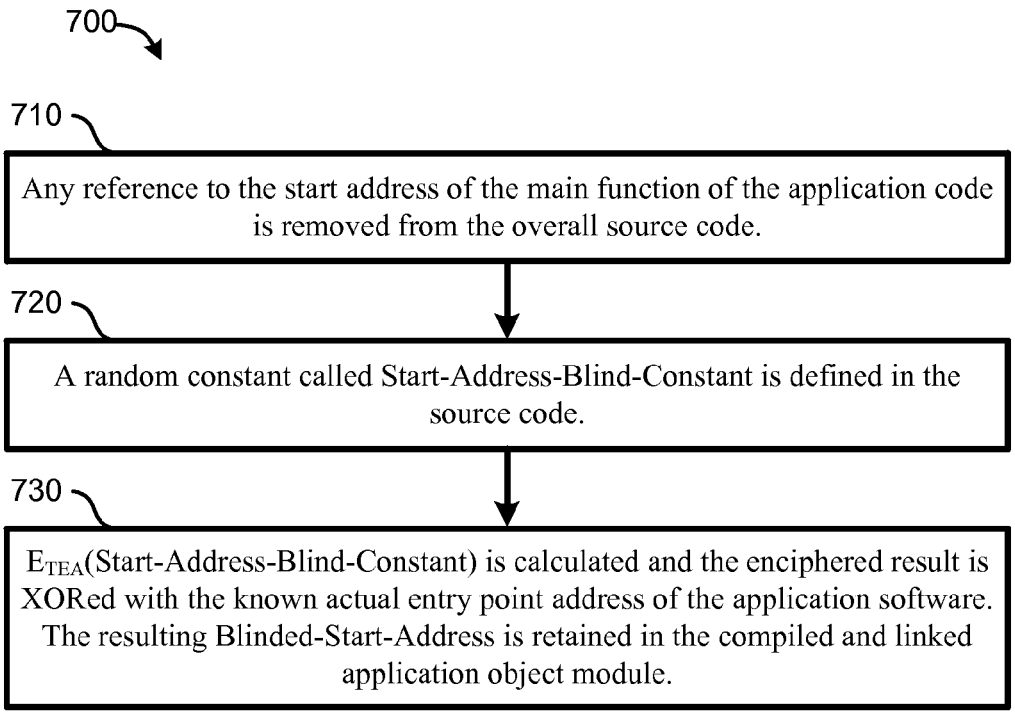
FIGS. 7A and 7B are simplified process flow diagrams illustrating embodiments of delivering, and starting an application, respectively.

Embodiments of a hardware cryptographic device provided herein implement a better method that enables the full protective power of the cryptographic hardware. Such embodiments can be utilized with the procedure 700 shown in FIG. 7A for delivering an application. The procedure can be included in software code that is executed, for example, by a computer processor. Referring to FIG. 7A, at block 710, for example, any reference to the start address of the main function of the application code is removed from the overall source code. This can include the initial call/invocation (other than as described below). At block 720, a random constant called Start-Address-Blind-Constant is defined in the source code. The random constant can be 32 or 64 bit, depending on the processor architecture. Finally, at block 730, the external cryptographic device with the hardware protected unique secret key can be used to calculate, at compile time, $E_{TEA}$(Start-Address-Blind-Constant). The enciphered result is XORed with the known actual entry point address of the application software, and the resulting calculated value, called Blinded-Start-Address, is retained in the compiled and linked application object module. Thus, $$\text{Blinded-Start-Address} := E_{TEA}(\text{Start-Address-Blind-Constant}) \oplus \text{Entry-Point};$$

Figure 7B:
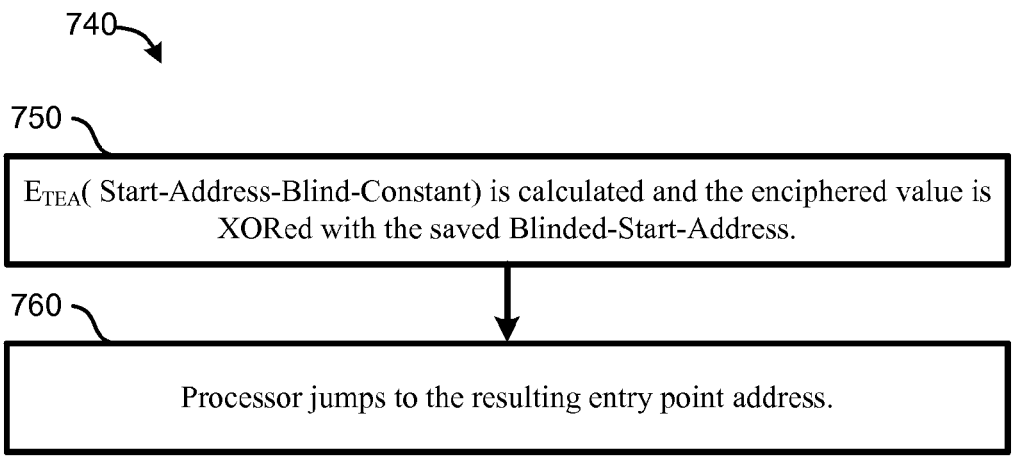

In conjunction with the application delivery procedure 700 outlined in FIG. 7A, an application start sequence can be performed (e.g., by a computer processor executing software code). An example of such an application start sequence is shown in FIG. 7B. In the embodiment shown in FIG. 7B, the application start sequence 740 can begin at block 750, where, $E_{TEA}$(Start-Address-Blind-Constant) is calculated and the enciphered value is XORed with the saved Blinded-Start-Address. The resulting value is the entry point address of the application software. And, at block 760, the processor jumps to that entry point address. Thus, $$\text{Entry-Point} := E_{TEA}(\text{Start-Address-Blind-Constant}) \oplus \text{Blinded-Start-Address};$$

where $E_{TEA}(X)$ means to TEA encipher X with the cryptographic module using the unique embedded secret key of the cryptographic device. For example, in an embodiment coded in Common Lisp, Blinded-Start-Address could be calculated at compile time with a Lisp macro and embedded in the runtime code.

Using an external cryptographic device in conjunction with procedures such as those described in relation to FIGS. 7A and 7B can have various advantages over other methods of encryption. For example, the entry point of the protected binary object software is nowhere revealed in the delivered code and the entire security resides with the secret key that is securely stored within the cryptographic hardware device to take advantage of the full security limit of that device. Of course, the level of security provided is only as strong as the encipherment algorithm used by the protecting hardware cryptographic device. But even simple external cryptographic devices can be strong enough for many applications. Moreover, the Crypto2000 device would be very strong all the way to the NIST-certified level.

Extending the Finger Asperity Resistive Discharge On-Chip Solution to Wafer-Scale Integration for Palm Print Capture Current fingerprint sensors can use resistive discharge techniques to read the ridges and valleys of fingerprints as pure single-digit binary images with a high degree of accuracy, high capture speed, far lower physical form factor height, immunity to sunlight, better operating temperature range, lower software processing requirements, and a lower manufacturing cost. Such designs include a coating comprised of a thin epoxy and metal emulsion layer that is applied on top of the solid state sensor to absorb and disperse electrostatic discharge from external sources, thereby protecting the integrated circuit that lies beneath the layer. The formulation of such fingerprint-resistive discharge sensors and associated three-dimensional algorithms are provided in U.S. Pat. No. 6,941,004 and U.S. Patent Application Nos. 2005/0254694, 2007/0047778, and 2007/0047779, all of which are hereby incorporated by reference. Without this type of protection, the sensor would become disabled or degraded over time. In addition, the coating provides scratch and abrasion resistance to result in a more rugged sensor.

The resistive discharge techniques above are typically used in asperity detector devices that are approximately 1.25×2.54 cm in size to enable simple flat-slap digit fingerprints to be captured. Such devices are therefore too small to capture full palm prints as well as single digit forensic full-rolled prints. To capture forensic palm prints that meet published standards (for example, the FBI IAFIS IQS standards), asperity detector devices would need to be much larger. For example, according to some standards, a sensor may need to be 5.5×8 inches in size for full palm scans, 5.5×5.5 inches for half-palm scans, or 1.75×5.5 inches for so-called writer palm prints. According to current methods, however, such larger-sized asperity detector devices would be difficult to reliably manufacture.

The smaller 1.25×2.54 cm asperity detector devices can be fabricated with good yields from dies cut from processed silicon wafers. In contrast, asperity detector devices large enough to capture images of palms would necessitate the use of wafer-scale or near-wafer-scale integration. However, defects in integrated circuit manufacturing cause chip yields to be less than 100% for virtually every wafer, making wafer-scale or near-wafer-scale perfect integration seemingly impossible. Techniques described herein below, however, provide for current integrated circuit manufacturing to be augmented to incorporate novel parallel data paths and parallel sensor elements to enable wafer-scale manufacturing processes, with its inherent flaws, to result in yields high enough to be economically realizable.

Figure 8A:
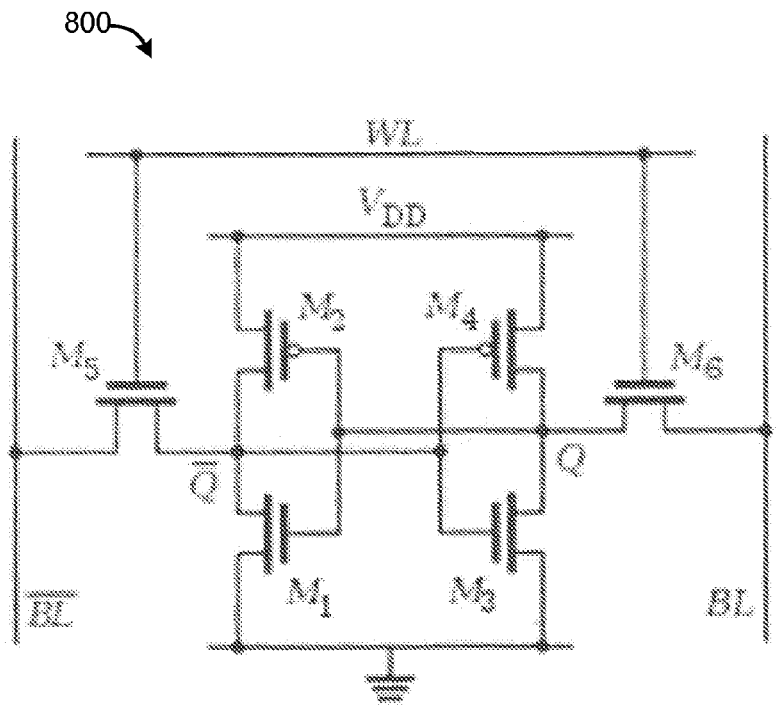
FIG. 8A is a schematic diagram of an embodiment of a standard CMOS static memory cell.

Most current palm print government standards require a resolution of up to one-thousand pixels per inch, which is low enough to incorporate hardware fault detection and, in particular, hardware fault correction integrated into the sensor design. Such detection and correction hardware will correct stuck-at-zero and stuck-at-one manufacturing faults that are inherent to wafer scale integration. The asperity detector devices with current state of the art usually comprise a plurality of solid-state (e.g., semiconductor) static memory cells made of, typically, six transistor elements per bit with fabricated silicon. FIG. 8A illustrates an embodiment of a standard CMOS static memory cell 800, having transistors $M_1$-$M_6$, bit lines BL, word line WL, and content (i.e., output) Q, which can be utilized by a sensor cell. The contents of the sensor cells are read by read elements in parallel. Roughly speaking, current solid state packing densities yield on the order of about 25,000 transistors per linear inch or on the order of 625-million transistors per square inch of silicon. Therefore, current manufacturing technology yields approximately 8,000 sensor cells (each with six transistors) per linear inch or about 64-million asperity sensor cells per square inch of silicon. The output of each sensor cell in the asperity detector device is single-bit binary. Thus, designing the device such that readable "supercells" that are defined as actually the result of hardware voting logic for clusters of, for example, five cells for each supercell will increase the wafer scale yield significantly. Each cluster can comprise a group of adjacent cells. The group can comprise an odd number of cells so that voting logic using the cells does not result in a tie.

With an n×n array of asperity sensor cells with each single cell having probability of failure of $p_{FAIL}$, the probability of having a perfect sensor array would be:

$$\prod_{k=1}^{n^2} (1 - p_{FAIL}) \tag{1}$$

Assuming, say, an 80% good die yield, with one-inch square dies, and with 12-inch diameter wafers, then the probability of a single asperity sensor cell being bad would be on the order of $3 \times 10^{-8}$. Thus, the probability of a 100% perfectly good 5.5×8-inch asperity detector device, containing 44-million asperity cells, would be on the order of $(1-3 \times 10^{-8})^{44\text{-million}}$ or very close to zero. However, duplicate components added to a system with voting logic decreases the probability of system failure by:

$$p = \prod_{i=1}^{n} p_i \tag{2}$$

where n is the number of redundant components; $p_i$ is the probability of single component failure; and p is the probability of overall voted system failure, where the "system" is, in this case, a single sensor supercell. Thus, with, for example, five-level voting on each supercell, the probability of failure of a single asperity supercell drops to on the order of $2.4 \times 10^{-38}$ and the probability of a 100% perfectly good 44-million supercell sensor array rises to about $(1-2.4 \times 10^{-38})^{44\text{-million}}$ or very close to 1.00.

It is important to note that the regular two-dimensional array of asperity sensor cells coupled with hardware voting will be even more realizable at the wafer scale integration level because single supercell errors that make it through the manufacturing process, unlike complex designs such as processor chips that require random digital logic that must all be perfect for the system to correctly function, can be easily eliminated at the software device driver level by simply not-ing and remembering the faulty supercells via an initial one-time calibration step that averages with adjacent live cells.

Figure 8B:
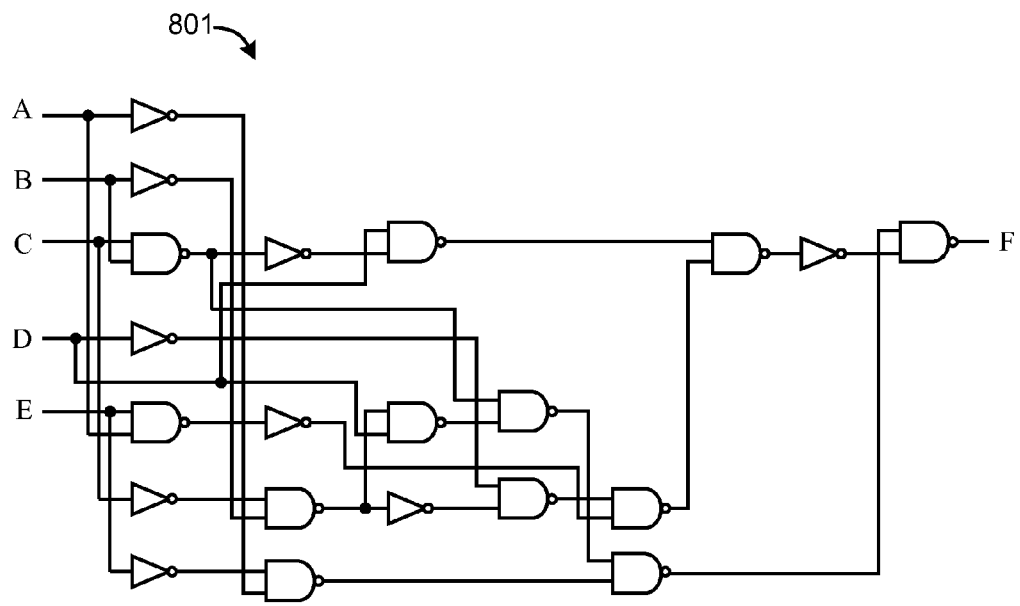
FIG. 8B is a logical schematic diagram of an embodiment of a supercell.

FIG. 8B is a logical schematic diagram 801 of an embodiment of a five-way voting supercell. If the outputs of the five possibly faulty (stuck at 0 or stuck at 1) asperity cells are represented by A, B, C, D, and E, then a suitable five-way voting logic would be the Boolean equation F=ABC+ABD+ACD+BCD+ABE+ACE+BCE+ADE+BDE+CDE where F represents the output value of the resulting supercell. The supercell F could be realized in silicon with the equivalent of the circuit diagram 801 above, which requires 12 two-input NAND gates and 9 logical invertors or, equivalently, on the order of about 66 transistors for each row and column of vote-corrected supercells, which would require on the order of about 0.1 square mm of silicon real estate for each row and for each column, which would result in about 80 voting logic blocks per linear inch. Thus, the voting logic would need to be clustered in relatively wide staggered strips along the x and y axes of the wafer.

The suggested five-way voting can be implemented, depending on actual reliability figures attained, with different lower voting levels, which could dramatically reduce the real estate requirements for the voting logic. Using such supercell clustering would reduce the asperity sensor cell count. In some implementations, for example, a maximum asperity sensor cell count may be about 3,000 pixel elements (supercells) per linear inch or about nine million supercells per square inch. In addition, the parallel x/y lines that read the supercells would also be multiplied by five (or so) to decrease the probability of faulty read lines in both x and y axes.

LiveScan Fingerprinting Anti-Spoofing

A significant problem with using livescan collected fingerprints as security tokens to, for example, gain access to secure facilities or to access secure banking or financial computer networks is fingerprint spoofing. For example, it is relatively easy to surreptitiously create a facsimile of an actual human fingerprint by using various organic gelatins, plastics, and the like. The actual fingerprint can be collected from a valid source using any of the usual latent techniques. Once the latent fingerprint has been collected from, for example, a coffee cup, soft drink can, or table surface, the latent print can be imprinted into the flexible spoof surface and then gelled into a permanent or near permanent flexible surface that can be used to spoof a biometric fingerprint scan read device to convince the system that a valid known fingerprint has been scanned. However, the asperity detector device described above can be extended to measure, on the fly and in real-time, the actual ohmic resistance between adjacent and/or far asperity pixel ridges, which can be learned from scan to scan.

Figure 26:
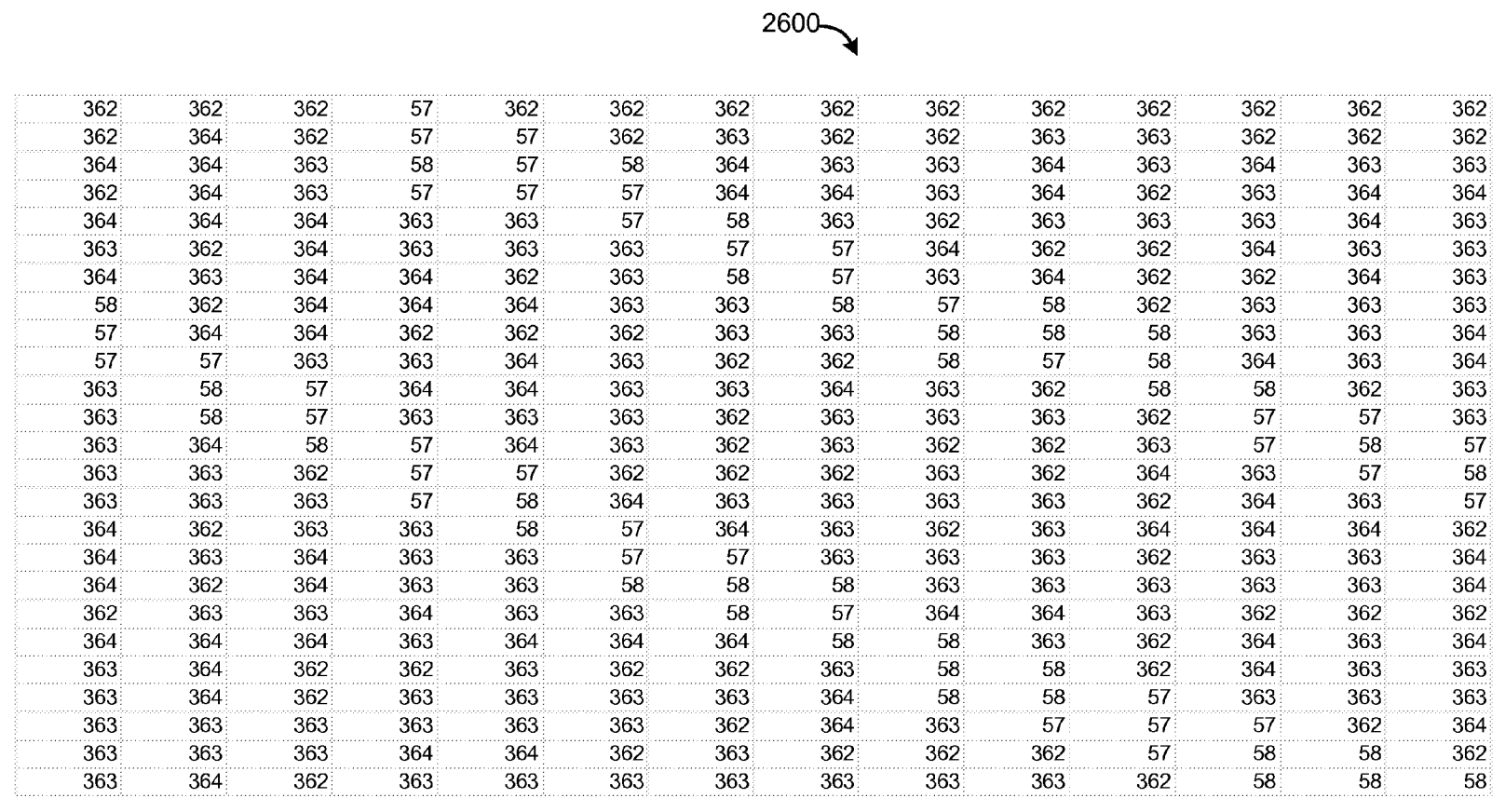

According to some embodiments, when a fingerprint is scanned with the asperity detector device, a resistance map can also easily be obtained that shows the actual measured resistance from each point of the scan to ground and/or from each point of the scan to any or to every other point of the scan. This resistance map is unique from individual to individual, but does vary by humidity, temperature, and other climatic issues and also by external factors such as current hand lotion use and the like. However, the ratios of the resistance measurements remain relatively constant and may be used, within ranges, to help identify and negate the various known fingerprint spoofing techniques. FIG. 26 is a representation of such a resistance map 2600, illustrating rows and columns of values of measured resistance, in kilohms, to ground for respective rows and columns of cells of an asperity detector device.

The measurement of the resistance values can be executed in a straightforward manner with the asperity detector device, by measuring, for example, the voltage drop in real-time as the inherent capacitance of each point of the scan is dissipated over time to ground as a function of resistance.

A Graphical User Interface for Fingerprint Capture and Management

The current state of the art for fingerprint collection devices can be advanced by employing an embedded color hardware touch screen as described in the '072 application. The system can be controlled, in real-time, by simply touching icons and other graphical items to inform the system about required actions etc. FIGS. 9-25 illustrate an example embodiment of a graphical user interface for fingerprint capture and management that can be utilized by any number of fingerprint collection devices.

Figure 9:
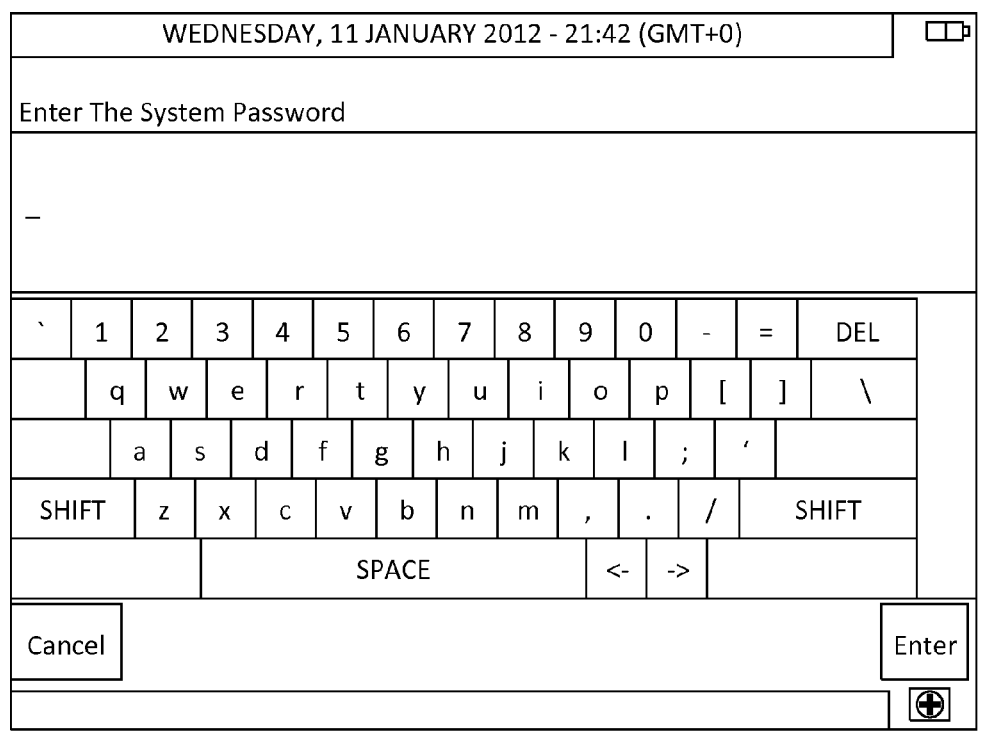

FIG. 9 illustrates an initial screen. Here the user can enter an alphanumeric passphrase that can be hashed and used as the password to unlock the embedded cryptographic system used to protect saved fingerprint information. Again, a more detailed description of such a process can be found in U.S. patent application Ser. No. 12/580,072.

Figure 10:
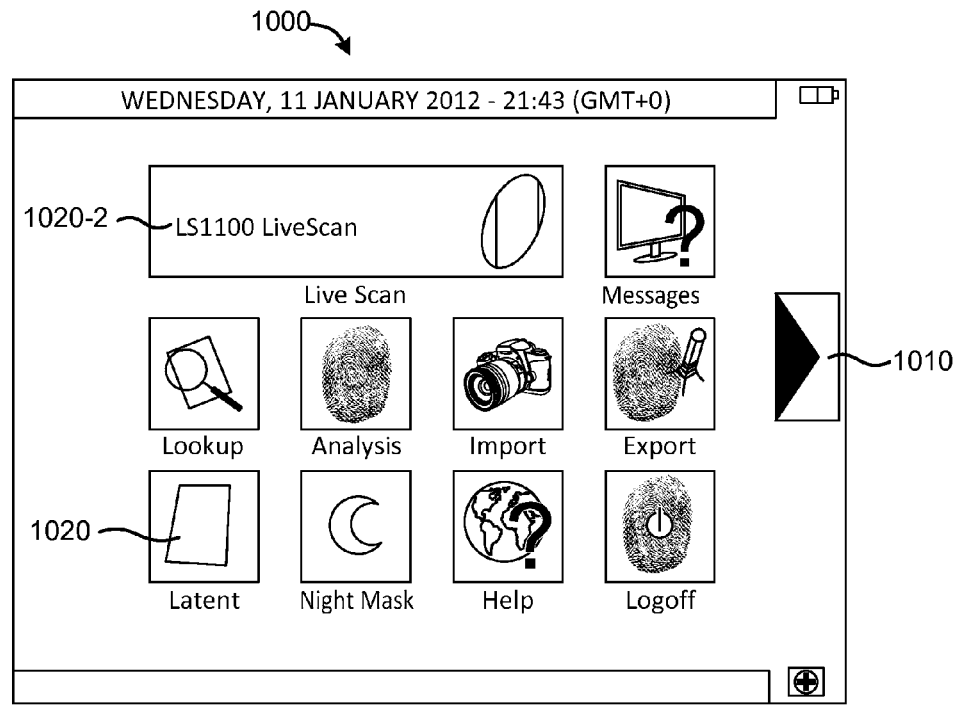
Figure 11:
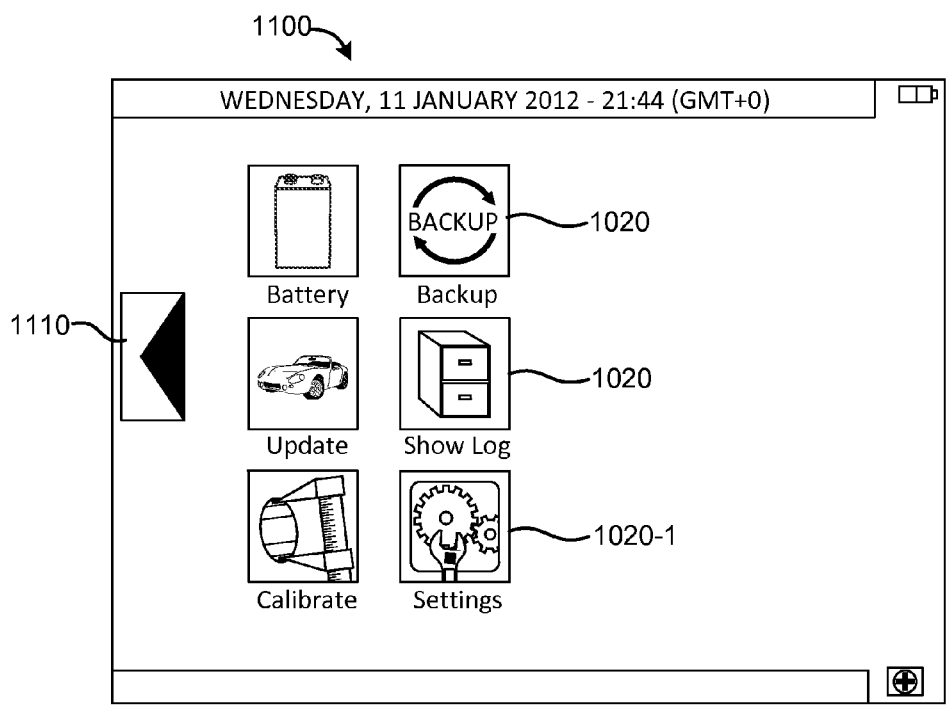

FIGS. 10-11 illustrates a pair of subsequent menu screens. For example, once the correct passphrase has been entered, a first top-level menu screen 1000 of FIG. 10 can appear. This screen is one or two top-level menu screens. The user can command basic functions by touching the desired graphical icon. A second top-level menu screen 1100 is shown in FIG. 11. The second top-level menu screen 1100 can be accessed by touching the large arrow 1010 on the right of the first top-level menu screen 1000. The large left 1110 arrow of the second top-level menu screen 1100 returns the user to the first menu screen. Any or all of the icons 1020 on the first and/or second menu screens can be animated to indicate a recognized physical touch.

FIG. 12 illustrates a settings screen 1200, which can be entered by pressing the settings icon 1020-1 on the second top-level menu screen 1100. The user or the system configurer can set various system parameters on this and its five associated subpages by pressing the needed tab button. Examples of parameters that can be configured include department originating codes, hardware configurations, digital transmission and security parameters etc.

Figures 13, 14:
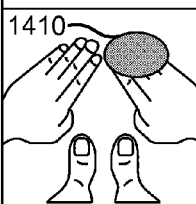

FIG. 13 illustrates a transaction type screen 1300, which can appear when the portable livescan system menu icon 1020-2 is pressed from the first top-level menu screen 1000. The type of transaction—for example, FBI FD-248 card, etc.—and the digital transmission type can be selected.

FIG. 14 illustrates a subsequent print collection screen 1400 entered by pressing the "Ok" icon on the menu screen 1200. Once the transaction type is known, the first print collection screen can appear and the system can collect the first print. The hand icon on the top-left of the screen can illustrate the item to be printed. In this case the right four-finger flat slap. As items are printed, the small guiding oval graphic 1410, currently on the right hand graphic, can automatically move to the next item to be printed.

Figure 15:
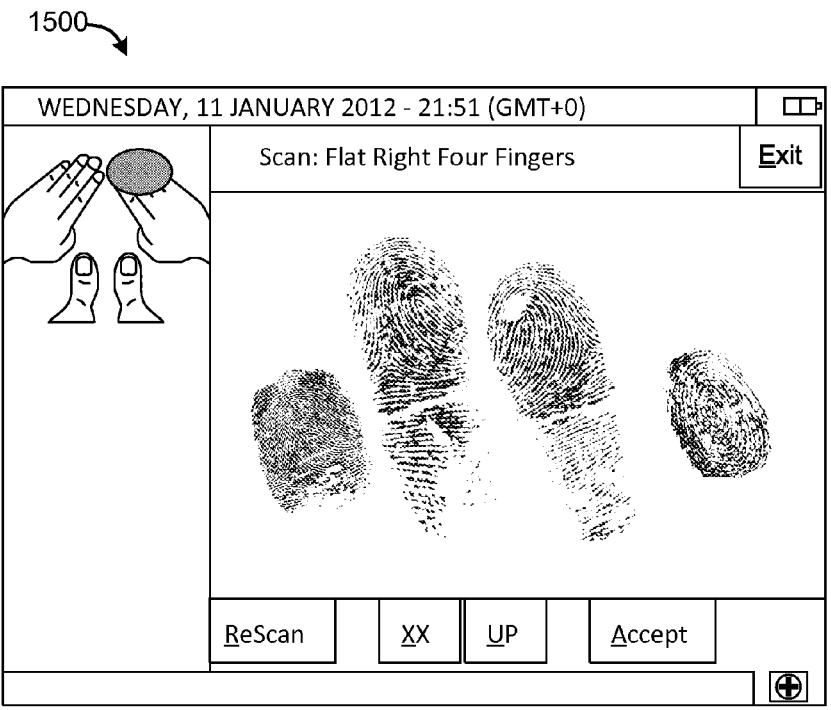
Figure 16:
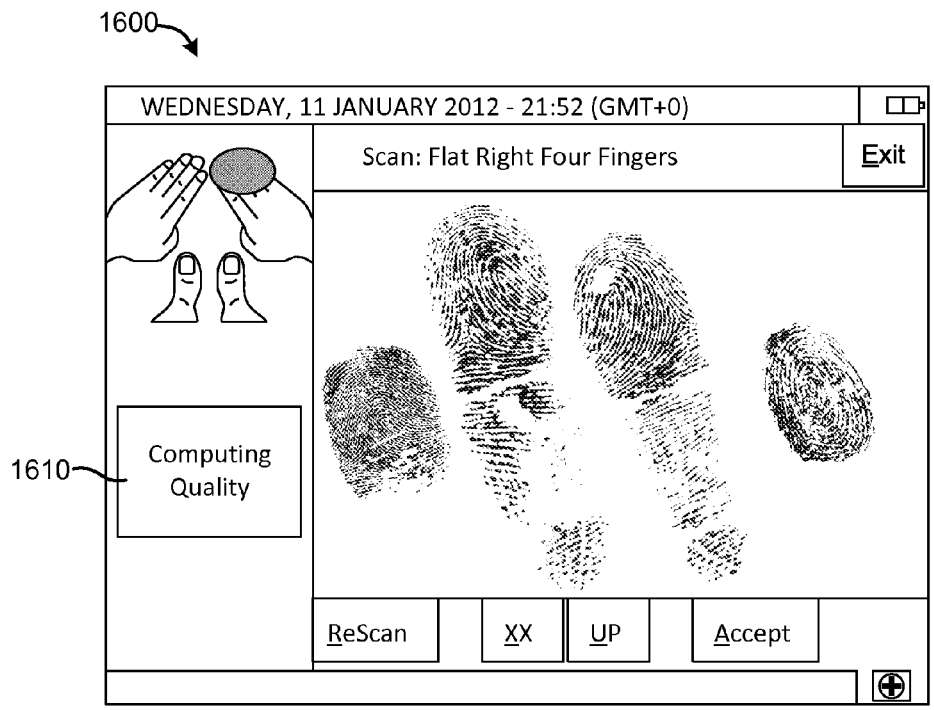

FIGS. 15-16 illustrate additional print collection screens. Referring to FIG. 15, As the fingerprint item is scanned, it displays the current collected image in real-time on the screen 1500 so that the operator can apply more or less pressure and orient the item correctly to get a good print. Once the print item has been collected, the system can automatically calculate a quality score for the print, which may require several seconds to complete. During the calculation process, the "Computing Quality" item 1610 can blink, as shown on the screen 1600 of FIG. 16.

Figure 17:
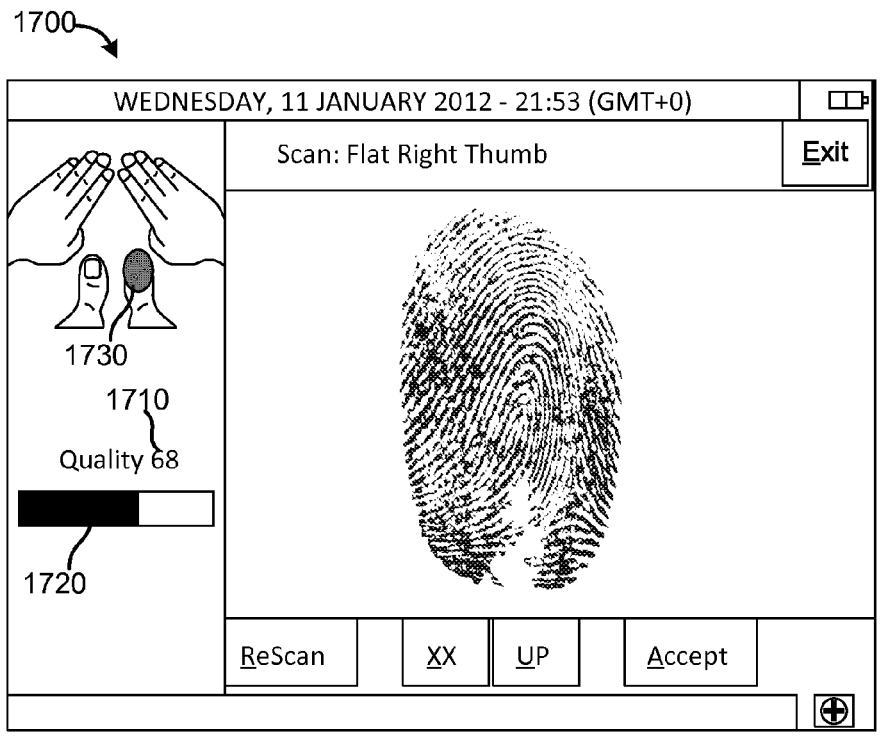

FIG. 17 illustrates yet another print collection screen 1700. Once the quality score has been calculated, it can be automatically displayed on the screen as a numeric value 1710 (e.g., within a range of 0-100) and/or as a color-coded sliding scale 1720. For example, green can mean good; yellow can mean acceptable; and red can mean unacceptable. Such color coding can be important for officer safety as officers can simply and quickly glance at the color and know if they have a good print. The guiding oval 1730 can automatically move to the next item to be printed, in this case the right thumb flat. The thumb scan has already been collected here.

Figure 18:
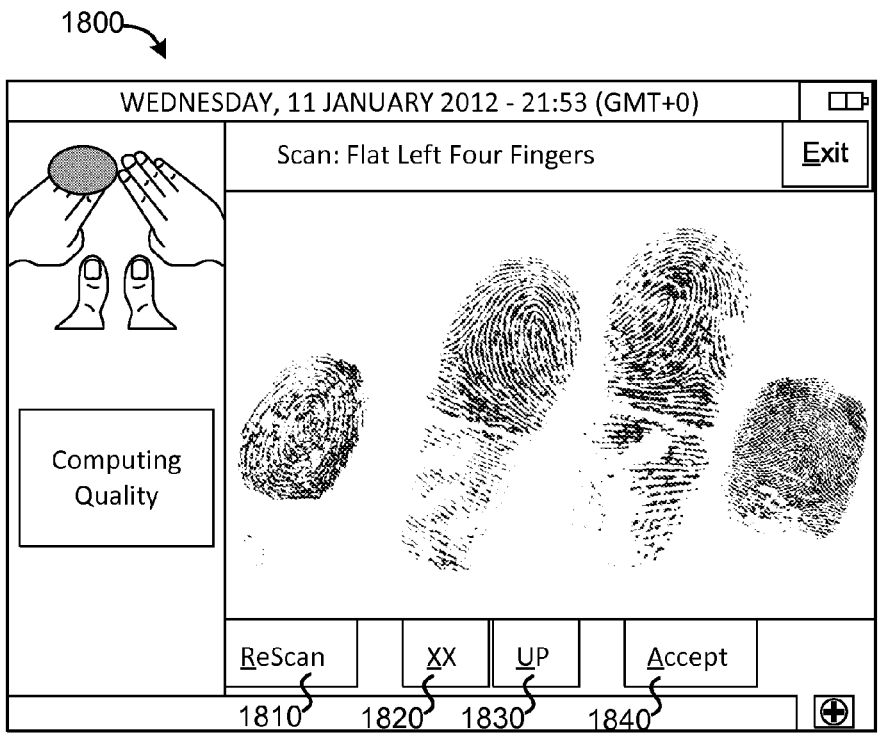
Figure 19:
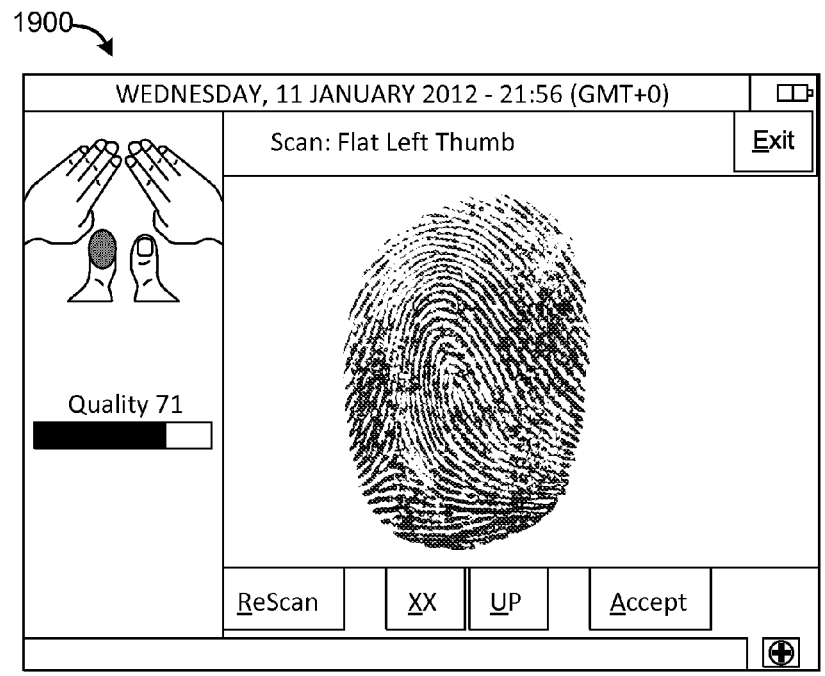
Figure 20:
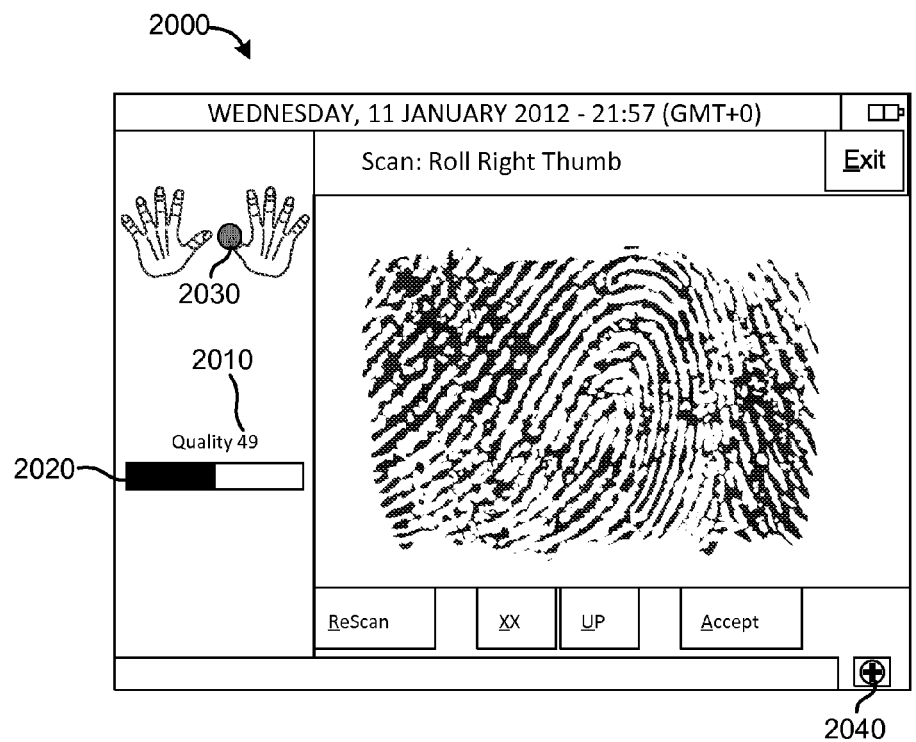
Figure 21:
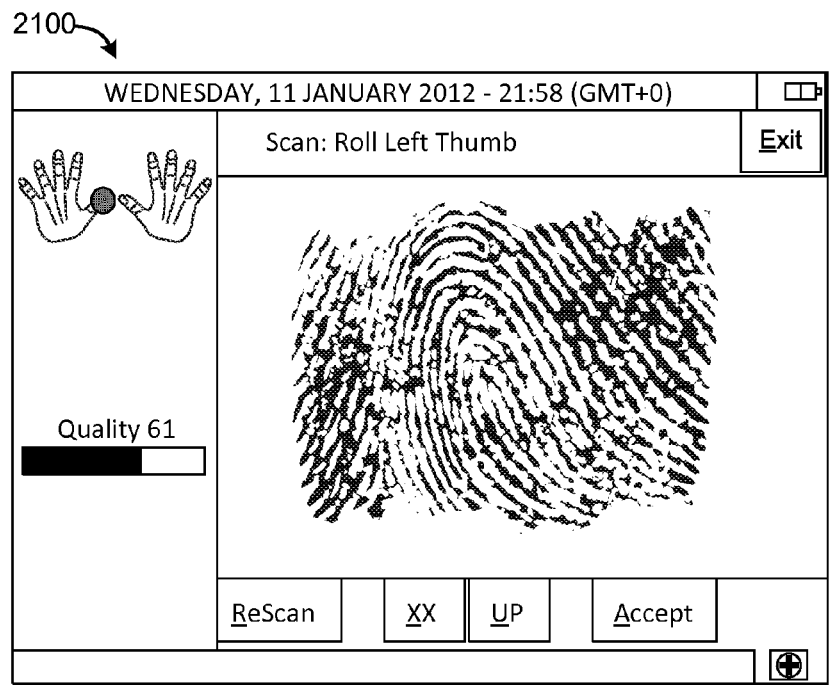

FIGS. 18-19 illustrate more print collection screens 1800 and 1900. In FIG. 18, after the right thumb flat has been collected, the system can automatically move to the left four-finger flat slap. In this screen, the left four-finger flat slap has been collected and the system is automatically calculating the quality score. If the user is not satisfied with the score, the item can be rescanned simply by pressing the "Rescan" button 1810. Pressing "XX" 1820 can tag the item as "amputated" and "UP" 1830 can tag the item as "unprintable". The user must press either "rescan," "XX," "UP," or the "Accept" button 1840 to move to the next item to fingerprint. Once the left four-finger flat slap has been collected, the system automatically moves to the left thumb flat as shown on screen 1900 of FIG. 19.

In the illustrated embodiment, once the right and left flat slap prints have been collected, the system can automatically move to the full-rolled single digit scans, as shown in FIGS. 20-23. The system can start with the right thumb and then moves to the right index, right middle, right ring, and then right pinkie. (Note that FIGS. 20-23 are illustrative, and may not show actual rolled fingerprints.) As shown in screen 2000 of FIG. 20, the right thumb has been rolled, collected, and quality scored 2010. A red color on the quality 2020 means that it should be re-rolled. At any time, the user can press the small Swiss flag icon 2040 at the bottom right and receive a separate help screen specific to the screen. Again, as the system moves through the fingers, the guiding oval 2030 can indicate the finger to be scanned. As shown on screen 2100 of FIG. 21, the entire right hand has been collected and the system is now ready to start on the left hand. A small rectangular icon on the top-right can indicate the amount of power left in the internal power pack.

Figure 22:
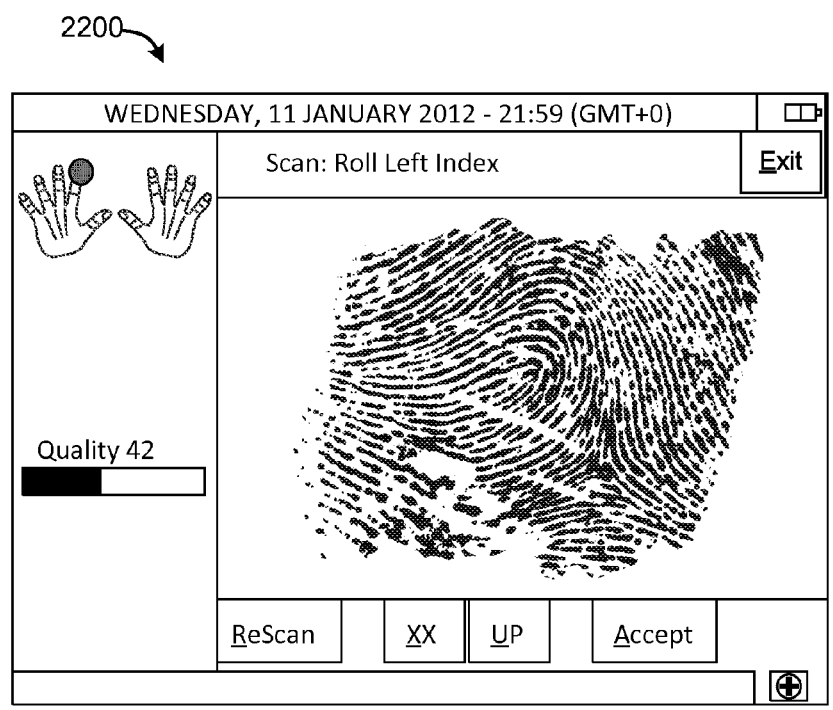
Figure 23:
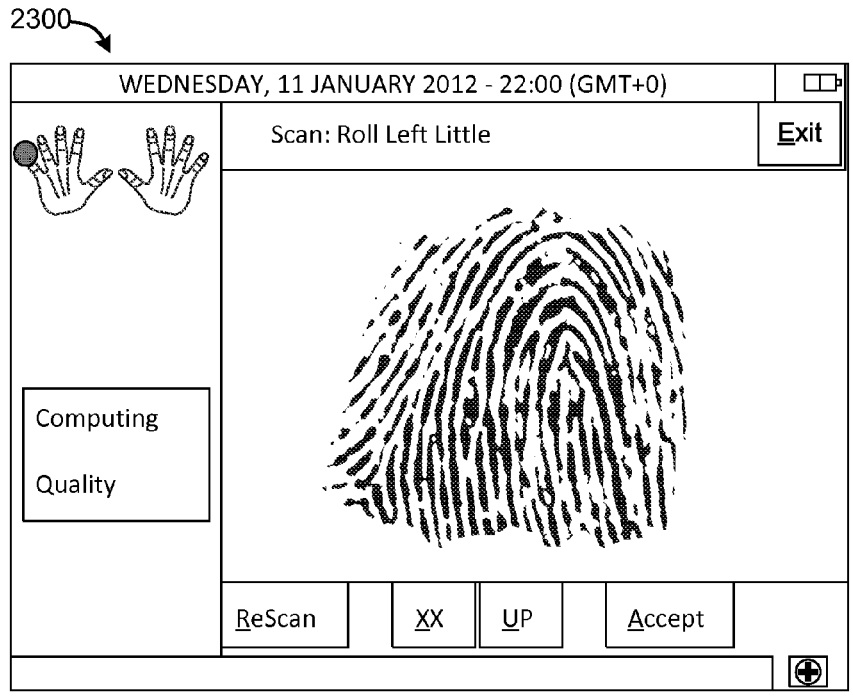

FIG. 22 illustrates a screen 2200 shown when the system has reached the left index. Note that as full-rolled fingers are collected, they can be automatically compared to the corresponding digits on the previously collected flat scans and, if they do not match, a "Sequence Error" fault can be indicated. This feature can be important for officer safety and to verify that a valid set of fingerprints has been obtained. As shown in screen 2300 FIG. 23, the left pinkie is scanned, and the system now has collected all of the fingerprints.

Figure 24:
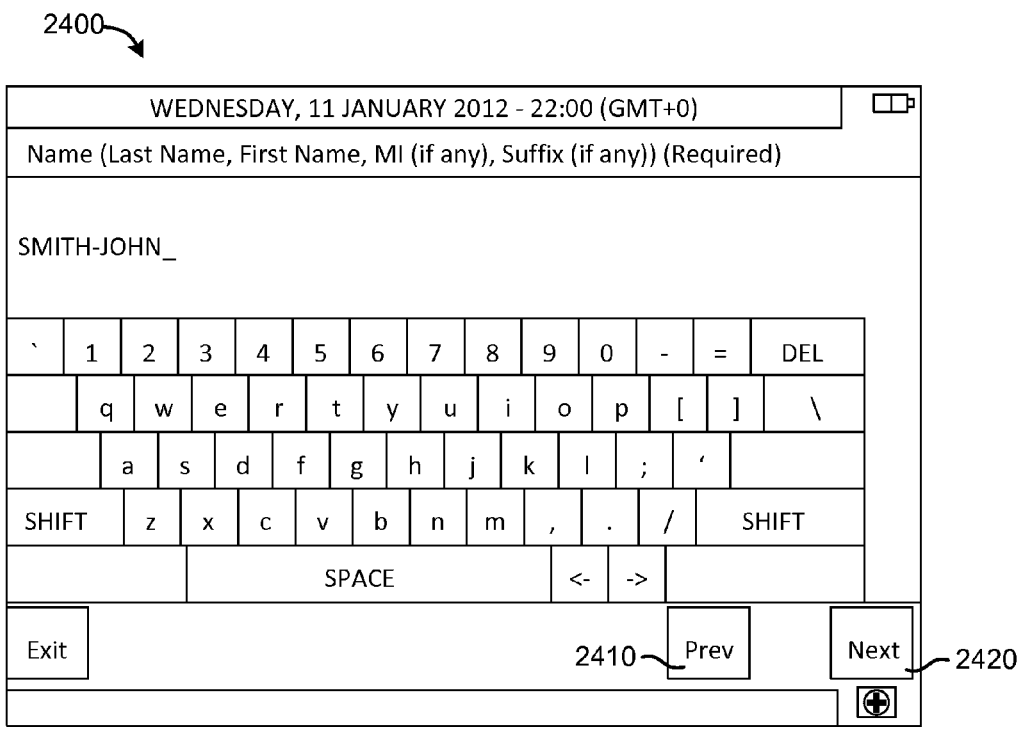

FIG. 24 illustrates a text collection screen 2400. After collecting some or all of the fingerprints, the system can automatically enter the text collection mode. Each text field needed for a particular type of transaction/card, in this case, the name of the subject, can be collected individually with a custom screen that can parse and validate the user-entered data. At any time, the "Prev" button 2410 may be touched to return to the previous text item. Repeated text items that are entered blank can be automatically terminated (for example, the State of Illinois can have as many as 999 criminal charge fields entered—enter the several relevant charges and then a blank charge and the charge field is terminated automatically). Touch the "Next" button 2420 and the system can automatically move to the next text field to enter.

FIG. 25 illustrates a transmission screen 2500. Once all of the text has been entered, then the system can transmit the collected fingerprint data and prints print cards.

Examples and embodiments provided above frequently utilize the term "fingerprint" to refer to a scanned portion of a subject's skin. However, the techniques described herein can be utilized with other scanned portions of skin, such as the palm, foot, etc. A person of ordinary skill in the art will recognize various variations, modifications, and substitutions.

Circuits, logic modules, processors, and/or other components may be described herein as being "configured" to perform various operations. Those skilled in the art will recognize that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Additionally, in the foregoing description, for the purposes of illustration, methods were described in a particular order. It should be appreciated that in alternate embodiments, the methods may be performed in a different order than that described or in parallel. It should also be appreciated that the methods described above may be performed by hardware components or may be embodied in sequences of machine-readable, or computer-readable, instructions, which may be used to cause a machine, such as a general-purpose or special-purpose processor or logic circuits programmed with the instructions to perform the methods. These machine-readable instructions may be stored on one or more machine-readable mediums, such as CD-ROMs or other type of optical disks, floppy diskettes, ROMs, RAMs, EPROMs, EEPROMs, magnetic or optical cards, flash/solid state memory, or other types of non-transitory machine-readable mediums suitable for storing electronic instructions. In addition program code may be encoded and transmitted via wired optical, and/or wireless networks conforming to a variety of protocols, including the Internet, thereby allowing distribution, e.g., via Internet download. Additionally, while the embodiments described above may make reference to specific hardware and software components, the methods may be performed by a combination of hardware and software.

The methods, systems, devices, graphs, and tables discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

What is claimed is:

1. A method for processing fingerprint data, the method comprising:
    receiving an image of a fingerprint;
    processing the image with a first set of processing parameter values;
    determining that a threshold amount of minutia has not been detected;
    processing the image with a second set of processing parameter values, wherein:
        the second set of processing parameter values is different than the first set of processing parameter values, and
        the second set of processing parameter values is based, at least in part, on information received via a data communication network; and
    in response to determining that the threshold amount of minutia has been detected using the second set of processing parameter values, updating the first set of processing parameter values based, at least in part, on one or more values of the second set of processing parameter values and transmitting information indicative of the updated first set of processing parameter values via the data communication network.

2. The method for processing the fingerprint data as recited in claim 1, further comprising:
    altering the image of the fingerprint based on the second set of processing parameter values; and
    transmitting the altered image of the fingerprint.

3. The method for processing the fingerprint data as recited in claim 1, wherein the first set of processing parameters comprises processing parameters locally stored by a fingerprint collection device.

4. The method for processing the fingerprint data as recited in claim 1, wherein the first set of processing parameters is based, at least in part, from input parameters.

5. The method for processing the fingerprint data as recited in claim 4, further comprising providing a user interface by which the one or more input parameters are received.

6. The method for processing the fingerprint data as recited in claim 5, wherein:
    the user interface comprises a touchscreen displaying a graphical representation of a soft keyboard; and
    a character associated with an input on the touchscreen is determined with a three-dimensional array indicating a location of the touchscreen and an attribute.

7. The method for processing the fingerprint data as recited in claim 6, wherein the graphical representation of the soft keyboard comprises a precomputed pixel image painted to a touchscreen display.

8. The method for processing the fingerprint data as recited in claim 5, wherein the one or more input parameters includes at least one parameter from the group of parameters consisting of:
    an indication of race,
    an indication of age,
    an indication of labor type,
    an indication of humidity,
    an indication of temperature, and
    an indication of gender.

9. The method for processing the fingerprint data as recited in claim 1, wherein the second set of processing parameter values is based, at least in part, on a date.

10. The method for processing the fingerprint data as recited in claim 1, wherein the second set of processing parameter values are based, at least in part, on communication received via the data communication network.

11. The method for processing the fingerprint data as recited in claim 10, wherein the communication is generated by a fingerprint collection device.

12. The method for processing the fingerprint data as recited in claim 1, further comprising enciphering data associated with the fingerprint by:
    seeding a random-number generator using a portion of the data associated with the fingerprint;
    selecting a random number generated by the random-number generator; and
    performing an XOR operation with the random number and the data associated with the fingerprint.

13. The method for processing the fingerprint data as recited in claim 1, wherein updating the first set of processing parameter values comprises updating the first set of processing parameter values such that the first set of processing parameter values are automatically optimized over time as additional finger print data is processed.

14. An apparatus for processing fingerprint data, the apparatus comprising:
    a fingerprint scanning module configured to scan a fingerprint and provide an image of the fingerprint;
    a user interface configured to receive one or more input parameters; and
    a processing module coupled with the fingerprint scanning module and configured to:
        receive the image of the fingerprint from the fingerprint scanning module;
        process the image with a first set of processing parameter values;
        determine that a threshold amount of minutia has not been detected;
        process the image with a second set of processing parameter values, wherein:
            the second set of processing parameter values is different than the first set of processing parameter values, and
            the second set of processing parameter values is based, at least in part, on information received using a network interface; and
        in response to determining that the threshold amount of minutia has been detected using the second set of processing parameter values, update the first set of processing parameter values based, at least in part, on one or more values of the second set of processing parameter values and transmit information indicative of the updated first set of processing parameter values using the network interface.

15. The apparatus for processing fingerprint data as recited in claim 14, wherein the processing module is further configured to:
    alter the image of the fingerprint based on the second set of processing parameter values; and
    transmit the altered image of the fingerprint.

16. The apparatus for processing fingerprint data as recited in claim 14, further comprising a memory, wherein the first set of processing parameters are stored in the memory.

17. The apparatus for processing fingerprint data as recited in claim 14, wherein the first set of processing parameters is based, at least in part, from input parameters.

18. The apparatus for processing fingerprint data as recited in claim 14, wherein:
the user interface comprises a touchscreen is configured to display a graphical representation of a soft keyboard; and
the processing module is configured to determine a character associated with an input on the touchscreen by using a three-dimensional array indicating a location of the touchscreen and an attribute.

19. The apparatus for processing fingerprint data as recited in claim 18, wherein the graphical representation of the soft keyboard comprises a precomputed pixel image painted to a touchscreen display.

20. The apparatus for processing fingerprint data as recited in claim 14, wherein the one or more input parameters includes at least one parameter from the group of parameters consisting of:
an indication of race,
an indication of age,
an indication of labor type,
an indication of humidity,
an indication of temperature, and
an indication of gender.

21. The apparatus for processing fingerprint data as recited in claim 14, wherein the second set of processing parameter values is based, at least in part, on a date.

22. The apparatus for processing fingerprint data as recited in claim 14, wherein the second set of processing parameter values are based, at least in part, on communication received using the network interface.

23. The apparatus for processing fingerprint data as recited in claim 22, further configured to communicate, using the network interface, to a second apparatus for processing fingerprint data.

24. The apparatus for processing fingerprint data as recited in claim 14, wherein the processing module is further configured to encipher data associated with the fingerprint by:
seeding a random-number generator using a portion of the data;
selecting a random number generated by the random-number generator; and
performing an XOR operation with the random number and the data associated with the fingerprint.

25. The apparatus for processing fingerprint data as recited in claim 14, further comprising a cryptographic module, wherein the processing module is configured to execute an application start sequence by:
calculating a first value using a unique key from the cryptographic module; and
determining an entry point address by performing an XOR operation with the first value and a second value determined from an application object module.

26. The apparatus for processing fingerprint data as recited in claim 14, wherein the fingerprint scanning module comprises:
a semiconductor device having a plurality of cells configured to take at least one measurement of a portion of a subject's skin; and
a plurality of supercells wherein each supercell comprises an odd number of adjacent cells configured to provide a single binary output.

27. The apparatus for processing fingerprint data as recited in claim 26, wherein each supercell comprises an odd number of cells suitable for hardware voting.

28. The apparatus for processing fingerprint data as recited in claim 26, wherein the at least one measurement comprises a voltage drop.

29. A non-transitory, machine-readable media having instructions embedded thereon for processing fingerprint data, wherein the instructions, when executed by one or more machines, cause the one or more machines to:
receive an image of a fingerprint;
process the image with a first set of processing parameter values;
determine that a threshold amount of minutia has not been detected;
process the image with a second set of processing parameter values, wherein:
the second set of processing parameter values is different than the first set of processing parameter values, and
the second set of processing parameter values is based, at least in part, on information received via a data communication network; and
in response to determining that the threshold amount of minutia has been detected using the second set of processing parameter values, update the first set of processing parameter values based, at least in part, on one or more values of the second set of processing parameter values and transmit information indicative of the updated first set of processing parameter values via the data communication network.

30. The non-transitory, machine-readable media as recited in claim 29, wherein the instructions further comprise instructions to:
alter the image of the fingerprint based on the second set of processing parameter values; and
transmit the altered image of the fingerprint.

31. The non-transitory, machine-readable media as recited in claim 29, wherein the first set of processing parameters comprises processing parameters locally stored by a fingerprint collection device.

32. The non-transitory, machine-readable media as recited in claim 29, wherein the instructions further comprise instructions to determine the first set of processing parameters based, at least in part, from input parameters.

33. The non-transitory, machine-readable media as recited in claim 32, wherein the instructions further comprise instructions to provide a graphical user interface by which the one or more input parameters are received.

34. The non-transitory, machine-readable media as recited in claim 33, wherein:
the graphical user interface comprises a graphical representation of a soft keyboard; and
the instructions further comprise instructions to determine a character associated with an input on the touchscreen by using a three-dimensional array indicating a location of the touchscreen and an attribute.

35. The non-transitory, machine-readable media as recited in claim 32, wherein the one or more input parameters includes at least one parameter from the group of parameters consisting of:
an indication of race,
an indication of age,
an indication of labor type,
an indication of humidity,
an indication of temperature, and
an indication of gender.

36. The non-transitory, machine-readable media as recited in claim 29, wherein the instructions further comprise instructions to determine the second set of processing parameter values based, at least in part, on a date.

37. The non-transitory, machine-readable media as recited in claim 29, wherein the instructions further comprise instructions to determine the second set of processing parameter values based, at least in part, on communication received via the data communication network.

38. The non-transitory, machine-readable media as recited in claim 29, wherein the instructions further comprise instructions to encipher data associated with the fingerprint by:
- seeding a random-number generator using a portion of the data;
- selecting a random number generated by the random-number generator; and
- performing an XOR operation with the random number and the data associated with the fingerprint.

39. A method for processing fingerprint data, the method comprising:
- receiving an image of a fingerprint;
- processing the image with a first set of processing parameter values;
- determining that a threshold amount of minutia has not been detected using the first set of processing parameter values;
- in response to determining the threshold amount of minutia has not been detected using the first set of processing parameter values, processing the image with a second set of processing parameter values, wherein:
  - the second set of processing parameter values is different than the first set of processing parameter values, and
  - the second set of processing parameter values is based, at least in part, on information received via a data communication network;
- determining that the threshold amount of minutia has not been detected using the second set of processing parameter values;
- in response to determining the threshold amount of minutia has not been detected using the second set of processing parameter values, automatically updating the second set of processing parameter values;
- determining that the threshold amount of minutia has been detected using the updated second set of processing parameter values; and
- in response to determining that the threshold amount of minutia has been detected using the updated second set of processing parameter values, transmitting information indicative of the updated second set of processing parameter values via the data communication network.

* * * * *